United States Patent
Chan et al.

(10) Patent No.: US 8,253,541 B2
(45) Date of Patent: Aug. 28, 2012

(54) METHOD AND APPARATUS FOR VARYING SIGNALS TRANSMITTED BY A TAG

(75) Inventors: Joseph S. Chan, Los Gatos, CA (US); Nikola Cargonja, San Carlos, CA (US); James G. Eagleson, San Jose, CA (US); Arthur E. Anderson, III, Sunnyvale, CA (US); Timothy K. Brand, Cupertino, CA (US); Ravindra U. Rajapakse, San Francisco, CA (US)

(73) Assignee: Savi Technology, Inc., Mountain View, CA (US)

( * ) Notice: Subject to any disclaimer, the term of this patent is extended or adjusted under 35 U.S.C. 154(b) by 1201 days.

(21) Appl. No.: 11/219,357

(22) Filed: Sep. 2, 2005

(65) Prior Publication Data

US 2006/0077041 A1    Apr. 13, 2006

Related U.S. Application Data

(63) Continuation of application No. 09/841,774, filed on Apr. 24, 2001, now Pat. No. 6,940,392.

(51) Int. Cl.
*H04Q 5/22* (2006.01)

(52) U.S. Cl. ..................................... 340/10.4

(58) Field of Classification Search ................. 340/10.4, 340/905, 572.4, 572.1, 505
See application file for complete search history.

(56) References Cited

U.S. PATENT DOCUMENTS

| | | | |
|---|---|---|---|
| 3,639,897 A | 2/1972 | Teich | |
| 3,656,100 A | 4/1972 | Beltrami | |
| 3,665,449 A | 5/1972 | Elder et al. | |
| 3,688,256 A | 8/1972 | D'Ausilio et al. | |
| 3,697,941 A | 10/1972 | Christ | |
| 3,735,335 A | 5/1973 | Kaplan et al. | |
| 3,757,290 A | 9/1973 | Ross et al. | |
| 3,772,669 A | 11/1973 | Johnston et al. | |
| 3,848,243 A | 11/1974 | Schirmer | |
| 3,961,323 A | 6/1976 | Hartkorn | |
| 4,054,881 A * | 10/1977 | Raab | 342/448 |

(Continued)

FOREIGN PATENT DOCUMENTS

EP    0 467 036 A2    1/1992

(Continued)

OTHER PUBLICATIONS

"Electromagnetic Radiation and How it Affects Your Instruments", OSHA Field Service Memo, OSHA Cincinnati Laboratory, Cincinnati, Ohio, pp. 1, 8, 9 and 10, May 20, 1990.

(Continued)

*Primary Examiner* — Vernal Brown
(74) *Attorney, Agent, or Firm* — Haynes and Boone, LLP

(57) ABSTRACT

An apparatus (10, 240, 300) includes a signpost (11, 241-256, 322, 612, 623, 626-628, 652, 661, 682, 686, 703) which transmits signpost signals (24) that are received by a tag (12, 271-275, 301-316, 395-397, 616-618, 641-643, 653, 656-657, 662-664, 679, 708, 711). The tag in turn transmits radio frequency beacon signals (72) which are received by a reader (13, 261, 319, 521-530). The tag can vary the duration of the beacon signals, for example in dependence on whether it is currently receiving a signpost signal. Further, the tag can dynamically vary the transmission rate and/or transmission power of the beacon signals, for example following receipt of a signpost signal. Varying these parameters can facilitate compliance with governmental regulations.

42 Claims, 10 Drawing Sheets

U.S. PATENT DOCUMENTS

| | | | |
|---|---|---|---|
| 4,095,872 A | | 6/1978 | Stieff et al. |
| 4,112,421 A | * | 9/1978 | Freeny, Jr. ............... 342/457 |
| 4,209,787 A | | 6/1980 | Freeny, Jr. |
| 4,262,284 A | | 4/1981 | Stieff et al. |
| 4,425,666 A | * | 1/1984 | Groth, Jr. ............... 375/275 |
| 4,529,982 A | | 7/1985 | Karlstrom et al. |
| 4,536,754 A | | 8/1985 | Holce et al. |
| 4,607,389 A | * | 8/1986 | Halgrimson ............. 455/11.1 |
| 4,627,248 A | | 12/1986 | Haworth |
| 4,683,461 A | | 7/1987 | Torre |
| 4,688,244 A | | 8/1987 | Hannon et al. |
| 4,750,197 A | | 6/1988 | Denekamp et al. |
| 4,768,816 A | | 9/1988 | Bakula |
| 4,811,578 A | | 3/1989 | Masoncup et al. |
| 4,811,977 A | | 3/1989 | Swift et al. |
| 4,816,803 A | | 3/1989 | Brown |
| 4,853,692 A | | 8/1989 | Wolk et al. |
| 4,877,276 A | | 10/1989 | Pastva |
| 4,883,295 A | | 11/1989 | Kesselman |
| 4,920,334 A | | 4/1990 | DeVolpi |
| 4,946,210 A | | 8/1990 | Fuehrer |
| 4,990,890 A | | 2/1991 | Newby |
| 4,996,909 A | | 3/1991 | Vache et al. |
| 5,005,883 A | | 4/1991 | Guiler |
| 5,025,253 A | | 6/1991 | DiLullo et al. |
| 5,050,794 A | | 9/1991 | Wischusen, III |
| 5,056,837 A | | 10/1991 | Fuehrer |
| 5,097,253 A | | 3/1992 | Eschbach et al. |
| 5,120,097 A | | 6/1992 | Fattori et al. |
| 5,125,700 A | | 6/1992 | Fattori et al. |
| 5,127,687 A | | 7/1992 | Guiler |
| 5,170,170 A | * | 12/1992 | Soumekh ............... 342/179 |
| 5,189,396 A | | 2/1993 | Stobbe |
| 5,247,564 A | | 9/1993 | Zicker |
| 5,257,283 A | * | 10/1993 | Gilhousen et al. ............ 455/522 |
| 5,284,036 A | | 2/1994 | Rosenbaum |
| 5,347,274 A | | 9/1994 | Hassett |
| 5,347,280 A | * | 9/1994 | Schuermann ............... 342/42 |
| 5,422,627 A | | 6/1995 | Tap et al. |
| 5,443,190 A | | 8/1995 | Cucheran et al. |
| 5,490,079 A | | 2/1996 | Sharpe et al. |
| 5,526,357 A | * | 6/1996 | Jandrell ............... 370/346 |
| 5,572,191 A | | 11/1996 | Lundberg |
| 5,594,738 A | | 1/1997 | Crisler et al. |
| 5,627,517 A | | 5/1997 | Theimer et al. |
| 5,631,642 A | | 5/1997 | Brockelsby et al. |
| 5,656,996 A | | 8/1997 | Houser |
| 5,686,902 A | | 11/1997 | Reis et al. |
| 5,774,876 A | | 6/1998 | Woolley et al. |
| 5,793,290 A | | 8/1998 | Eagleson et al. |
| 5,804,810 A | | 9/1998 | Woolley et al. |
| 5,831,531 A | * | 11/1998 | Tuttle ............... 340/568.2 |
| 5,892,441 A | | 4/1999 | Woolley et al. |
| 5,929,779 A | * | 7/1999 | MacLellan et al. ............ 340/10.2 |
| 5,959,568 A | | 9/1999 | Woolley |
| 5,977,913 A | * | 11/1999 | Christ ............... 342/465 |
| 6,034,603 A | | 3/2000 | Steeves |
| 6,067,476 A | | 5/2000 | Siler |
| 6,069,563 A | | 5/2000 | Kadner et al. |
| 6,094,164 A | | 7/2000 | Murphy |
| 6,130,623 A | * | 10/2000 | MacLellan et al. ............ 340/5.1 |
| 6,140,956 A | | 10/2000 | Hillman et al. |
| 6,243,005 B1 | | 6/2001 | Haimovich et al. |
| 6,281,793 B1 | | 8/2001 | Haimovich et al. |
| 6,294,953 B1 | | 9/2001 | Steeves |
| 6,298,306 B1 | | 10/2001 | Suarez et al. |
| 6,326,889 B1 | * | 12/2001 | Van Horn et al. ............ 340/572.1 |
| 6,339,745 B1 | | 1/2002 | Novik |
| 6,362,738 B1 | * | 3/2002 | Vega ............... 340/572.1 |
| 6,539,050 B1 | | 3/2003 | Lee et al. |
| 6,542,114 B1 | | 4/2003 | Eagleson et al. |
| 6,720,888 B2 | | 4/2004 | Eagleson et al. |
| 6,747,558 B1 | | 6/2004 | Thorne et al. |
| 6,765,484 B2 | | 7/2004 | Eagleson et al. |
| 6,940,392 B2 | | 9/2005 | Chan et al. |
| 6,963,270 B1 | * | 11/2005 | Gallagher et al. ............ 340/10.2 |

FOREIGN PATENT DOCUMENTS

| | | |
|---|---|---|
| EP | 0 825 554 A1 | 2/1998 |
| EP | 0 984 400 A2 | 3/2000 |
| EP | 1 317 733 B1 | 4/2010 |
| WO | WO 98 / 31070 | 7/1998 |
| WO | WO 98/32092 A1 | 7/1998 |
| WO | WO 99 / 60512 | 11/1999 |
| WO | WO 00 / 41333 | 7/2000 |
| WO | WO 01/08116 A2 | 2/2001 |
| WO | WO 01/27891 A1 | 4/2001 |
| WO | WO 01/44831 A1 | 6/2001 |
| WO | WO 02/21429 A2 | 3/2002 |
| WO | WO 02/21429 A3 | 3/2002 |

OTHER PUBLICATIONS

Straw, R. Dean, editor, "The ARRL Antenna Book", The American Radio Relay League, Inc., Newington, Connecticut, title page, copyright page and pp. 2-6 and 2-7.

Kraus, John D., "Antennas", Second Edition, McGraw-Hill, Inc., New York, New York, title page, copyright page, and pp. 60-61, 1988.

Lancaster, Don, "Tech Musings", Synergetics, Thatcher, Arizona, pp. 138.1-138.6, Jul. 1999.

U.S. Appl. No. 60/332,480, filed Nov. 9, 2001 by Roderick E. Thorne, Philip J. Keieshian, Timothy R. Redler, Joseph S. Chan and Nikola Cargonja for "Unit Load Device Tracking System", cover sheet and 21 pages.

U.S. Appl. No. 60/230,728, filed Sep. 7, 2000 by Arthur E. Anderson III, James G. Eagleson, and William E. Blasdell for "Method and Apparatus for Providing Container Security with a Tag", cover sheet and 46 pages.

"KXU-LFTX1 Transceiver", Cover Sheet with Block Diagram and Schematic, submitted to FCC on Jul. 29, 1999, by RF Technologies, Brookfield, Wisconsin, (3 sheets).

"KXU-LUXP1 Transponder", Cover Sheet with Block Diagram and Schematic, submitted0 to FCC on Jul. 28, 1999 by RF Technologies, Brookfield, Wisconsin, (3 sheets).

EPO Communication pursuant to Rules 70(2) and 70a(2) EPC dated Jul. 11, 2011, and EP Extended Search Report dated Jun. 7, 2011, in related European Patent Appl. No. 10156655.2.

Response to EPO Communication filed Jan. 6, 2012, in related European Patent Appl. No. 10156655.2.

* cited by examiner

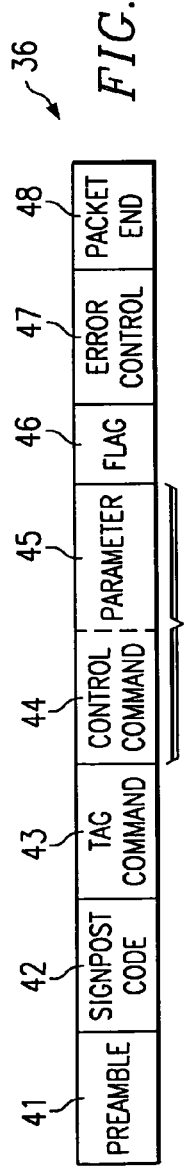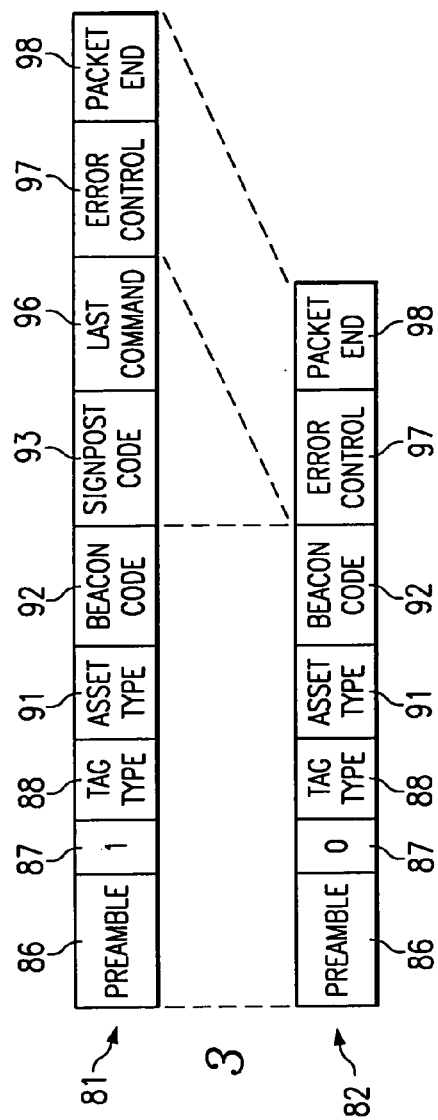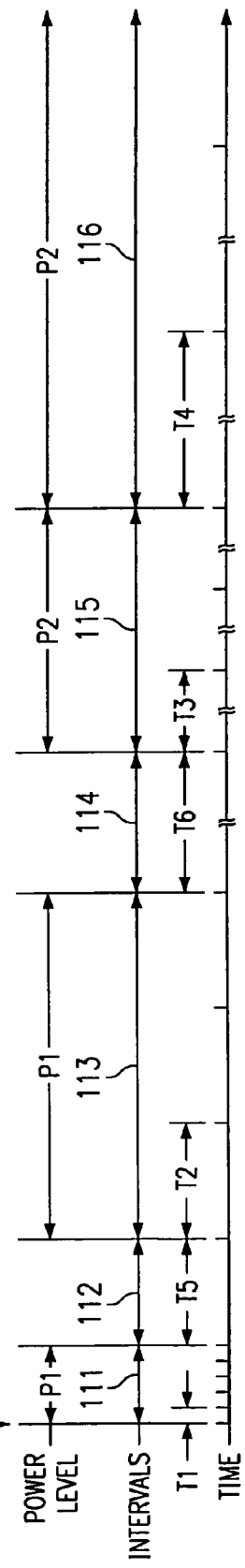

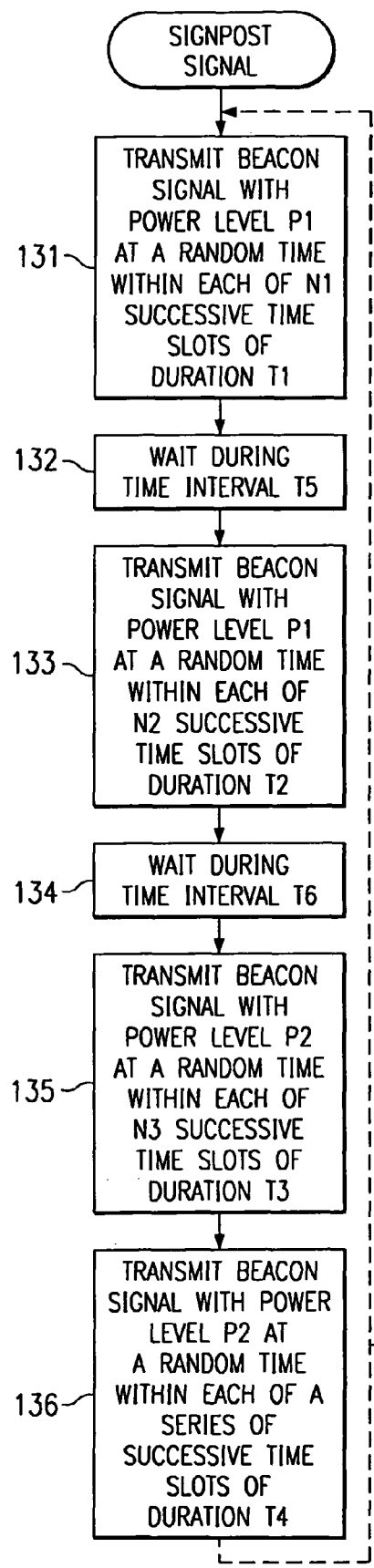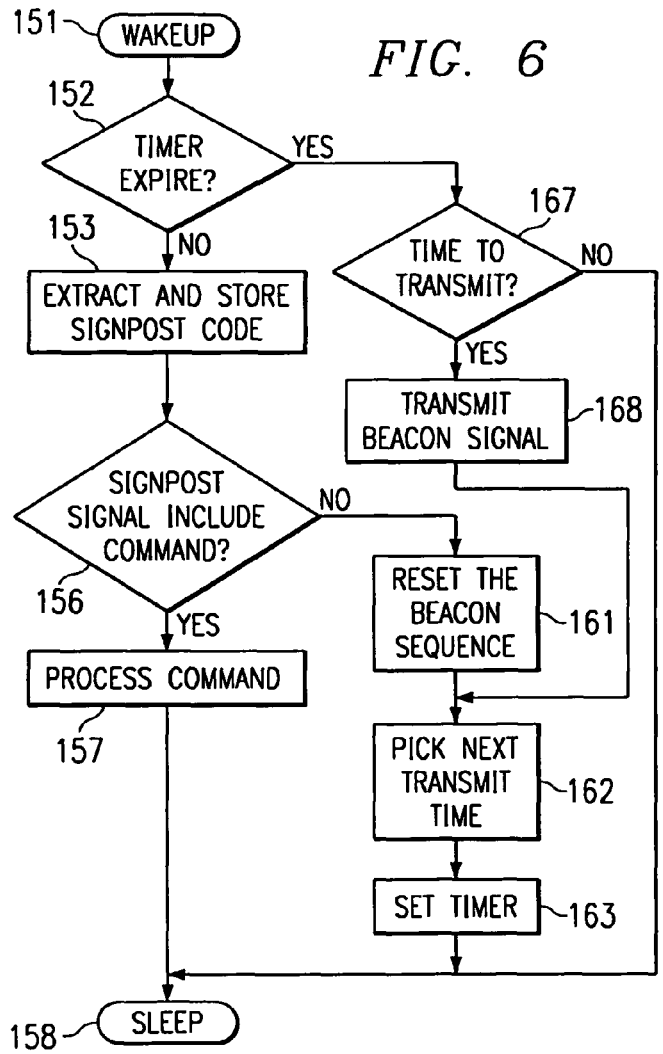
FIG. 5
FIG. 6

METHOD AND APPARATUS FOR VARYING SIGNALS TRANSMITTED BY A TAG

This application is a continuation of U.S. Ser. No. 09/841,774 filed Apr. 24, 2001.

STATEMENT REGARDING COPYRIGHT RIGHTS

A portion of this patent disclosure involves material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates in general to techniques for tracking mobile items, and more particularly, to a method and apparatus for tracking items using radio frequency identification tags.

BACKGROUND OF THE INVENTION

According to an existing technique for tracking mobile items, a device known as a tag is mounted on the item, and communicates by radio frequency signals with a central receiver, which is commonly known as a reader. Systems of this basic type have been generally adequate for their intended purposes, but have not been satisfactory in all respects.

In this regard, the manner in which a tag transmits radio frequency information can create issues relating to compliance with governmental regulations, because governmental regulations often effect a balancing between factors such as transmission length, transmission power and transmission rate. In existing tags, the tag design involves selection of a predetermined balance between transmission duration, transmission power, and transmission length, and then operation of the tag is carried out using this predetermined balance.

SUMMARY OF THE INVENTION

From the foregoing, it may be appreciated that a need has arisen for a method and apparatus for tracking items using radio frequency identification technology, in a manner which permits variation of certain characteristics of the transmitted signals. According to a first form of the present invention, a method and apparatus are provided to address this need and involve: receiving in a receiver section of a tag wireless signpost signals that each include a signpost code; and transmitting from a transmitter section of the tag wireless beacon signals which each include a beacon code associated with the tag. The transmitting activity includes: causing the transmitter section to be responsive to receipt by the receiver section of a respective signpost signal for including in at least one beacon signal the signpost code from the received signpost signal; and causing the transmitter section to transmit the beacon signals in a selected one of first and second formats which are different, the transmitter section using the first format in response to receipt of one of the signpost signals and using the second format in response to the absence of receipt of any of the signpost signals for a specified time interval, the first format including a signpost field containing the signpost code from the most recently received signpost signal, and the second format lacking the signpost field and being shorter in length than the first format.

A different form of the present invention involves: receiving in a receiver section of a tag wireless signpost signals that each include a signpost code; and transmitting from a transmitter section of the tag wireless beacon signals which each include a beacon code associated with the tag. The transmitting activity includes: causing the transmitter section to be responsive to receipt by the receiver section of a respective signpost signal for including in at least one beacon signal the signpost code from the received signpost signal; and causing the transmitter section to be responsive to receipt by the receiver section of one of the signpost signals for automatically effecting variation in a predetermined manner of at least one of a transmission power level and a transmission rate for the beacon signals.

BRIEF DESCRIPTION OF THE DRAWINGS

FIG. 2 is a diagrammatic view of a digital word which is transmitted by the signpost of FIG. 1;

FIG. 3 is a diagrammatic view of two different digital words, either of which can be transmitted by the beacon tag of FIG. 1;

FIG. 4 is a diagram showing a sequence and timing with which the beacon tag of FIG. 1 transmits beacon signals;

FIG. 5 is a flowchart showing in a different form the beacon signal sequence which is depicted in FIG. 4;

FIG. 6 is a high-level flowchart showing still other aspects of the operation of the beacon tag of FIG. 1;

DETAILED DESCRIPTION OF THE INVENTION

Figure 1:
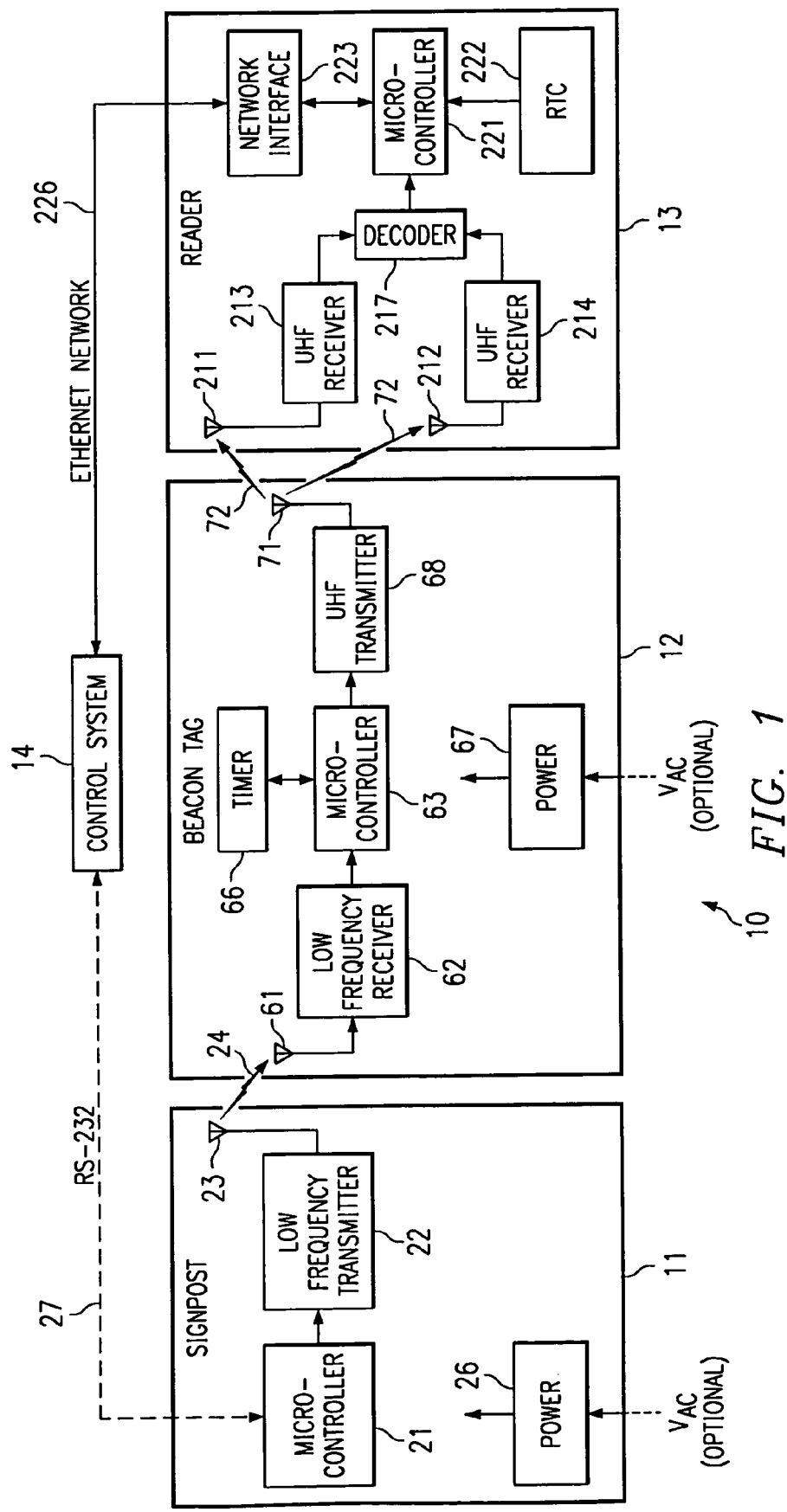
FIG. 1 is a block diagram of an apparatus which embodies features of the present invention, and which includes a signpost, a beacon tag, a reader, and a control system.

FIG. 1 is a block diagram of an apparatus 10 which embodies features of the present invention. The apparatus 10 includes a signpost 11, a beacon tag 12, a reader 13, and a control system 14. The apparatus 10 actually includes many signposts of the type shown at 11, many tags of the type shown at 12, and several readers of the type shown at 13. However, for clarity in explaining certain fundamental aspects of the present invention, FIG. 1 shows only one signpost 11, one tag 12, and one reader 13.

Focusing first on the signpost 11, the signpost 11 includes a microcontroller 21. Persons skilled in the art are familiar with the fact that a microcontroller is an integrated circuit which includes a microprocessor, a read only memory (ROM) containing a computer program and static data for the microprocessor, and a random access memory (RAM) in which the microprocessor can store dynamic data during system operation. The signpost 11 also includes a low frequency transmitter 22 which is controlled by the microcontroller 21, and which transmits a low frequency signpost signal 24 through an antenna 23. The transmitter 22 is of a type known to those skilled in the art, and is therefore not illustrated and described here in detail, The antenna 23 of the signpost 11 can be a ferrite core and/or planar coil antenna of a known type. The antenna 23 is configured to transmit an omni-directional signal, but it will be recognized that the antenna could alternatively be configured so as to transmit a signal which is to some extent directional.

In the embodiment of FIG. 1, the transmitter 22 generates the signpost signal 24 by effecting amplitude modulation of a carrier signal, which can have a frequency within a range of approximately 30 KHz to 30 MHZ. In the embodiment of FIG. 1, and with due regard to compliance with governmental regulations of various countries regarding electromagnetic emissions, the carrier frequency is selected to be 132 KHz, but could alternatively be some other frequency, such as 125 KHZ or 13.56 MHZ. A further consideration in the selection of the indicated frequency range is that the signpost signals 24 will exhibit near field characteristics. The localized nature of signals in this frequency range helps to facilitate compliance with governmental regulations in the specific context of the present invention, and also helps to minimize reception of these signals by other tags of the type shown at 12, which are in the general vicinity of the signpost 11 but are beyond an intended transmission range of the signpost signals 24. As known by persons skilled in the art, a signal with near field characteristics has a roll-off which is roughly three times higher than the roll-off for a signal with far field characteristics. Consequently, the signpost signals 24 intentionally have a relatively short transmission range, which in the disclosed embodiment is adjustable but is typically about four to twelve feet. Due to the fact that the signpost signals 24 exhibit near field characteristics, the transmission and reception of the signpost signals 24 may be viewed as more of a magnetic coupling between two antennas, rather than a radio frequency coupling.

The signpost 11 also includes a power source 26, which would typically be a battery that is capable of powering the signpost for several years. However, in situations where the signpost 11 is stationary rather than mobile, it is alternatively possible to power the signpost 11 from a standard source of 120 VAC power, as indicated diagrammatically in FIG. 1 by a broken line.

As shown diagrammatically by a broken line 27 in FIG. 1, the microcontroller 21 of the signpost 11 can optionally be coupled to the control system 14 by a standard RS-232 serial interface. The RS-232 interface would typically be present only where the signpost 11 is fixedly mounted in a stationary location, as opposed to a situation where the signpost 11 is mounted on some form of mobile device. Alternatively, the RS-232 interface could couple the signpost 11 to the reader 13, because the reader 13 would typically be closer to the signpost 11 than the control system 14. In that case, when the control system 14 wished to communicate with the signpost 11, it would do so through the reader 13. Although the interface 27 in FIG. 1 is an RS-232 interface, it will be recognized that it could alternatively be some other suitable interface, such as an Ethernet interface, an RS-485 interface, or a wireless interface.

The signpost 11 transmits the signpost signal 24 at periodic intervals. The time interval between successive transmissions may be configured to be relatively small, such as 100 msec, or relative large, such as 24 hours, depending on the particular circumstances of a given signpost 11 relative to the rest of the system. Each signpost signal 24 transmitted by the signpost 11 includes several different elements of information, which will now be discussed in association with FIG. 2.

More specifically, FIG. 2 is a diagrammatic view of a digital word 36 having several different fields of information which are discussed below. The bits of the digital word 36 are transmitted in the signpost signal 24 by serially modulating the bits of the word 36 onto the 132 KHz carrier using amplitude modulation, as mentioned above. The bits of the words 36 are transmitted serially from left to right in FIG. 2. The first field is a preamble 41, which is a predefined pattern of bits that will allow a device receiving the signal to recognize that the signpost signal is beginning, and to synchronize itself to the signpost signal. In the disclosed embodiment, the preamble is approximately 8 bits, but the specific number of bits can vary in dependence on characteristics of the particular receiver which is expected to be used to receive the signpost signal.

The next field 42 in the word 36 is a signpost code, which in the disclosed embodiment is a 12-bit integer value that uniquely identifies the particular signpost 11 which is transmitting the word 36. As mentioned above, the system 14 may have a number of signposts 11, and the use of different signpost codes 42 by different signposts permits the system to distinguish signpost signals transmitted by one signpost from those transmitted by another, in a manner discussed in more detail later.

This does not mean that this system could never have two signposts with exactly the same signpost code. For example, two signposts might be stationarily mounted in close proximity to each other and configured to independently transmit effectively identical signpost signals 24, not in synchronism, in order to increase the likelihood that a receiver will pick up the signpost signal from at least one of the two signposts. In effect, this represents a level of redundancy, in order to increase reliability and accuracy. A different possible scenario is that two signposts 11, which are fixedly mounted at respective locations remote from each other, could conceivably use exactly the same signpost code 42. For example, if they each communicated with the control system 14 through a respective different reader 13, the control system 14 would have the capability to distinguish them from each other.

The next field in the word 36 of FIG. 2 is a tag command 43, which is a command to the beacon tag 12 that can affect the operation of the beacon tag 12. The tag command field 43 is a 2-bit field. Since the purpose of the tag command field 43 is to affect the operation of the beacon tag 12, a discussion of specific examples of these commands will be deferred until after the beacon tag 12 has been described in more detail. The next two fields in the word 36 are a control command 44 and a parameter 45, which are related. In the disclosed embodiment, the control command 44 is a 4-bit field, and a parameter 45 is an 8-bit field. The control command 44 is similar to the tag command 43, to the extent that they each instruct the tag 12 to do something. The difference is that the control commands 44 generally requires an accompanying parameter 45, whereas the tag commands 43 do not use parameters. A discussion of the control commands 44 is deferred until later, after the tag 12 has been discussed in more detail.

The next field in the word 36 is an extension flag 46, which is a 1-bit field. In the disclosed embodiment, this field is always a binary "0" for the word format 36 of FIG. 2. It is provided for the purpose of facilitating future compatibility. For example, if it was necessary at some future time to modify the format of the word 36, the flag 46 would be set to a binary "1" in each word having the new format, so that a device receiving the signpost signal 24 could determine whether the word 36 received in that signal had the original format shown at 36 in FIG. 2, or the new format.

The next field in word 36 is an error control field 47. Since communications between the signpost 11 and other devices are essentially one-way transmissions, and since many applications for the apparatus 10 of FIG. 1 involve environments that have relatively high noise levels, it is important for a receiving device to be able to evaluate whether the word 36 it received in a signpost signal is correct, or whether it has errors. Consequently, the error control field 47 is included to provide a degree of forward error correction (FEC). In the disclosed embodiment, the error control field 47 contains eight parity bits, but the number of parity bits may be different if the total number of bits in the word 36 is changed, or if a different one of several well-known parity schemes is selected for use. In addition to use of the error control field 47, the overall level of reliability and accuracy can also be increased by causing a device which receives the signpost signal 24 to save and compare two successive transmissions of a given signpost signal 24, in order to verify that they are completely identical.

The last field in the word 36 is a packet end field 48. This field signals to a receiving device that the transmission is ending. In the embodiment of FIG. 2, the packet end field 48 has eight bits which are all set to a binary "0".

As mentioned above, the signpost signal 24 is typically transmitted in a relatively noisy environment. In order to ensure reliable signal detection, known techniques may be employed to improve the signal to noise ratio (SNR). In the disclosed embodiment of FIG. 1, the amplitude modulation of the 132 KHz carrier is effected using the well-known technique of amplitude shift keying (ASK), in order to improve the SNR. Alternatively, frequency shift keying (FSK) or phase shift keying (PSK) could be used to achieve an even higher SNR. However, FSK or PSK would typically require additional front-end analog circuitry in each tag 12. Therefore, and since an object of the present invention is to implement both the signpost 11 and the tag 12 at a low cost, ASK is used in the embodiment of FIG. 1.

As noted above, communications between the signpost 11 and the beacon tag 12 are one-way communications involving the signpost signals 24. With this in mind, it is desirable to provide a degree of security that ensures the beacon tag 12 will react only to valid signpost signals 24, especially with respect to the commands in fields 43-45. Therefore, the fields 42-47 in the word 36 can be subjected to security protection using well-known encryption and/or password techniques.

As discussed above, the signpost 11 in the embodiment of FIG. 1 transmits the signpost signal 24 at a frequency of 132 KHz, in order to provide those signals with an effective range which does not exceed about twelve feet. In some applications, however, there may be a need for a somewhat longer range for the signpost signals. In that case, the signpost signals 24 could be transmitted using a different carrier, for example a high frequency microwave carrier of approximately 2.4 GHz, which would be effective in providing a range of about twenty-five feet. Of course, use of signals at this microwave frequency means that the signpost 11 should generally have a line-of-sight relationship to each tag 12 to which it is transmitting.

Turning to the beacon tag 12, the tag 12 includes a receiving antenna 61 which receives the signpost signals 24 transmitted by the signpost 11. The antenna 61 is coupled to a low frequency receiver 62 of a known type, which is designed to receive the signpost signals 24, extract from them the information shown in word 36 of FIG. 2, and then supply this information to a microcontroller 63 of the tag 12. The tag 12 also includes a timer 66 which can be used by the microcontroller 63 to measure time intervals that are discussed later. The tag 12 further includes a power source 67, which is typically a battery. However, in a situation where the tag 12 is stationarily mounted, the power source 67 could alternatively be an AC/DC adapter which is powered by an external source of 120 VAC power, as indicated diagrammatically by a broken line in FIG. 1.

The microcontroller 63 controls an ultra high frequency (UHF) transmitter 68 of a known type, which in turn is coupled to a transmitting antenna 71 of a known type. In the disclosed embodiment, the antenna 71 is omni-directional, but it will be recognized that the antenna 71 could alternatively be configured to be directional. Using the transmitter 68 and the antenna 71, the microcontroller 63 of the tag 12 can transmit beacon signals 72 to the reader 13. In the embodiment of FIG. 1, the beacon signals 72 are generated by FSK modulation of certain beacon information onto a carrier signal having a frequency of 433.92 MHz. A suitable alternative frequency is 915 MHz, but the frequency of 433.92 MHz is used in the disclosed embodiment because it is available for use in a wider number of countries than 915 MHz under prevailing governmental regulations for transmission of electromagnetic signals. The transmission range for the beacon signals 72 is substantially longer than that for the signpost signals, and in the disclosed embodiment can be up to about 300 feet. The beacon signals 72 are transmitted using a technique known in the art as a slotted aloha protocol, to reduce interference between beacon signals transmitted by different beacon tags.

In the disclosed embodiment, the beacon information transmitted in the beacon signals 72 may take one of two different forms, both of which are shown in FIG. 3. More specifically, if the beacon tag 12 has received a valid signpost signal 24 through the antenna 61 and the receiver 62, the beacon information transmitted in the beacon signal 72 will have the word format shown at 81 in FIG. 3. In contrast, during periods of time when the beacon tag 12 is outside the transmission range of the signpost signals 24 from any signpost 11, the beacon information transmitted in the signal 72 will have the word format shown at 82 in FIG. 3. In the disclosed embodiment, fields 87-88, 91-92 and 97 (and fields 93 and 96 in the case of the word 81) are all transmitted using Manchester encoded FSK modulation at 27.7 Kbps.

The word format 81 will be discussed first. It begins with a preamble 86, which is functionally comparable to the preamble 41 of the word 36 shown in FIG. 2. In the disclosed embodiment, the preamble 86 lasts 1.296 microseconds, and includes 20 cycles which each include a 30 microsecond logic high and a 30 microsecond logic low, followed by one cycle which includes a 42 microsecond logic high and then a 54 microsecond logic low. The next field in the word 81 is a 1-bit format field 87, which is provided to indicate to a receiving device which of the two formats 81 and 82 in FIG. 3 is the format used for the instant beacon signal. Thus, the field 87 is always a "1" bit in word 81, and a "0" bit in word 82.

The next field in the word 81 is a 4-bit tag type field 88, which is a code that provides some information about how the particular tag 12 is being used in the system. In this regard, the code may indicate that the tag is stationarily mounted, for example on a ceiling, or may indicate that the tag is mounted on some form of mobile device. Further, where the tag is mounted on a mobile device, the tag type code 88 can provide some information about that mobile device, such as whether that mobile device has a standard height, or has a taller, high profile height.

The next field in the word 81 is a 3-bit asset type field 91. Where the tag 12 is attached to some type of mobile device, the asset type field 91 can identify the specific type of mobile device to which the tag is attached. For example, the field 91 may indicate that the asset is attached to some form of container, to a trailer or dolly on which a container can be transported, or to a tractor capable of pulling trailers having containers thereon.

The next field in the word 81 is a signpost code 93. This is identically the signpost code extracted at 42 from the signpost word 36 that was most recently received by the beacon tag 12. In the disclosed embodiment, the word 81 has only one signpost code field 93. Consequently, a system according to the disclosed embodiment should be configured so that each beacon tag 12 is within the transmission range of only one signpost at any given point in time. However, it will be recognized that additional fields could be provided for additional signpost codes in the word 81, so that the tag 12 could be within the transmission range of multiple signposts at the same time, while receiving and reporting signpost codes for all of those signposts.

The next field in word 81 is a last command field 96, which is identically the last command that was received in either of the fields 43 or 44 of the signpost word 36 provided by the signpost having the signpost code which is present in the field 93. This provides confirmation to the control system 14 that the tag 12 received this particular command from the signpost 11.

The next field in the word 81 is an error control field 97. In the disclosed embodiment, this is a 16-bit field containing a cyclic redundancy code (CRC) of a known type, which is calculated using the information in fields 87-88, 91-93 and 96. The beacon signals 72 transmitted by the tag 12 to the reader 13 are essentially one-way signals, and the error control field 97 is therefore provided to give the reader 13 a degree of capability to detect and correct some errors in a received word 81. The reader 13 can also increase accuracy and reliability by receiving and comparing two successive beacon signals 72 and verifying that they are identical.

The last field in the word 81 is a packet end field 98, which in the disclosed embodiment is a logic low of 36 microseconds. The packet end field 98 indicates to a receiving device that the field 98 is the end of the word 81 which is currently being received.

Turning to the alternative format 82 of the beacon word, the basic difference from the word 81 is that the fields 93 and 96 of the word 81 are omitted from the word 82. This is because the fields 93 and 96 contain information extracted from the last received signpost word 36. In contrast, as mentioned above, the beacon word 82 is used in situations where the beacon tag 12 is not currently receiving any signpost signals, and thus has no current information to put into the fields 93 and 96. Therefore, the fields 93 and 96 are omitted in word format 82.

In theory, it would be possible to use the word format 81 even when the tag 12 is not currently receiving information from any signpost, and to simply put a "dummy" code such as all zeros into each of the fields 93 and 96. However, governmental regulations regarding radio transmissions tend to involve a balancing between factors such as the power level at which a beacon signal 72 is transmitted, the time interval between successive transmissions of beacon signals 72, and the amount of information present in each beacon signal. By using the beacon word format 82 when the fields 93 and 96 are not needed, the duration of the transmission of the beacon signal 72 is reduced, which in turn facilitates compliance with governmental regulations.

There are two other differences between the beacon word format 82 and the beacon word format 81. First, the field 87 is always a binary "1" in word 81, and a binary "0" in the word 82, as discussed above. Second, the CRC value used in error control field 97 is calculated using fields 87-88 and 91-92 in beacon word 82, because the fields 93 and 96 are not present, and thus cannot be taken into account.

Each transmission of the beacon signal 72 is similar to the transmission of a signpost signal 24, in that it is a short burst at the carrier frequency which includes one occurrence of either the word 81 or the word 82 (FIG. 3). The beacon tag 12 uses one technique for sequencing the beacon transmissions 72 when the tag 12 is not currently receiving any valid signpost signals 24, and uses a different technique for sequencing the beacon signals 72 in response to the receipt of a valid signpost signal 24.

In this regard, during any given time interval, a number of different beacon tags 12 may all be trying to transmit respective different beacon signals 72 to a given reader 13, and it is inevitable that two or more of these tags will attempt to transmit beacon signals 72 at the same time, such that the signals interfere or "collide" with each other at the reader 13. The two different techniques used for transmitting the beacon signals 72 each seek to reduce the likelihood that any two tags 12 will transmit beacon signals 72 in a synchronized manner that causes successive beacon transmissions 72 from each of these two tags to repeatedly collide. Consequently, each technique is intended to ensure that, even if two tags each happen to transmit a beacon signal 72 at approximately the same point in time, the next successive beacon signals from these two tags will not occur at the same point in time.

In more detail, and beginning with the situation where the tag 12 is not currently receiving any valid beacon signals 24, the tag 12 operates in a normal transmission mode in which it divides ongoing time into a succession of time slots having equal lengths, for example 60 second time slots, and in which it effects transmission of one beacon signal 72 within each time slot, at a randomly selected time within that time slot. In the disclosed embodiment, the random selection is actually done with a pseudo-random calculation of a known type, which closely approximates a truly random determination. References herein to random determinations are intended to include techniques such as pseudo-random determinations.

When the tag 12 receives a valid signpost signal 24, it immediately interrupts the normal mode of transmission and switches to a special mode of transmission. At the end of the special mode of transmission, it reverts back to the normal mode. The special mode is discussed in association with FIG. 4, in which the horizontal axis at the bottom represents the progression of time from left to right. The vertical line at the left side of FIG. 4 represents the point in time at which a valid signpost signal is received, and represents the point in time at which the tag 12 responds by switching from the normal mode to the special mode. The special mode involves five successive time intervals 111-115, which are each discussed separately below. After the last time interval 115 of the special mode, the tag 12 reverts from the special mode to the normal mode, where operation in the normal mode is represented by the time interval 116.

Time interval 111 involves N1 successive time slots which each have a duration of T1. In the disclosed embodiment, N1 is 5, and T1 is 0.1 seconds. The tag 12 transmits the beacon signal 22 once during each of these five time slots, at a randomly selected point within that time slot. These five time slots are represented diagrammatically in FIG. 4 by the spaces between the short vertical lines within time interval 111 along the horizontal axis at the bottom of FIG. 4.

It will be noted that the operation of the tag during interval 111 is somewhat similar to the operation of the tag during its normal mode, but there are two basic differences. First, the time slots in the normal mode are each about 600 times longer than the time slots in time interval 111, and thus the beacon signal 72 is being transmitted an average of 600 times more often than in the normal mode.

Second, during the time interval 111, the tag 12 transmits each beacon signal 72 at a power level P1, which is 24 dB lower than a power level P2 used during normal operation. As mentioned above, governmental regulation of UHF transmissions can involve a degree of balancing between the duration of each transmission, the time interval between successive transmissions, and the power level of the transmissions. Consequently, since the transmissions in time interval 111 have a longer duration than transmissions in the normal mode (because they involve beacon word 81 of FIG. 3 rather than beacon word 82), and since they are sent an average of 600 times as often, the reduced power level P1 is used for these transmissions in order to facilitate compliance with government regulations. The power level which is being used at any given point in time is set forth along the top of FIG. 4.

Time interval 111 is followed by time interval 112, which is a delay or wait state having a duration T5, where T5 is 1 second in the disclosed embodiment. During the time interval 112, the tag 12 does not transmit any beacon signals 72.

Time interval 112 is followed by time interval 113, which is handled in a manner similar to time interval 111, except that some parameters are different. In particular, time interval 113 includes N2 successive time slots which each have a duration of T2. In the disclosed embodiment, N2 is 3, and P2 is 1 second. A single beacon signal 72 is transmitted during each T2 time slot, at a randomly-selected time within that time slot. Beacon signals 72 that are transmitted during the time interval 113 are transmitted at the reduced power level P1 which was used in time interval 111.

Time interval 113 is followed by time interval 114, which is a delay or wait state similar to time interval 112. In particular, no beacon signals 72 are transmitted, and the time interval has a duration of T6, which in the disclosed embodiment is 10 seconds.

Time interval 114 is followed by the time interval 115, which involves activity similar to the time intervals 111 and 113. In particular, time interval 115 includes N3 time slots which each have a duration of T3. In the disclosed embodiment, N3 is 3, and P3 is 10 seconds. A single beacon signal 72 is transmitted during each of these time slots, at a randomly-selected point within the time slot. In the time interval 115, the tag 12 reverts to the higher power level of P2. In this regard, it will be noted that the average rate of transmission of beacon signals in time interval 115 is about one-tenth of the average rate of transmission of beacon signals in time interval 113, and is about one one-hundredth of the average rate of transmission in time interval 111. Thus, and with reference to the above-discussed balancing between the duration of transmissions, the time interval between transmissions, and the power level, the tag 12 can revert to the higher power level P2 as a result of the significant decrease in the average rate of transmissions, while still complying with government regulations.

Time interval 115 is followed by time interval 116 which, as mentioned above, represents a reversion to the normal mode of operation. In particular, the tag 12 continuously divides ongoing time into successive time slots that each have a duration T4, where T4 is 60 seconds. These beacon signals are each transmitted at the higher power level P2, using the shorter format of the beacon word which is shown at 82 in FIG. 3. The time interval 116 does not have a specified duration, and will continue until the tag 12 receives a further valid signpost signal which causes it to again switch to the special mode and carry out the beacon sequence shown in FIG. 4.

The foregoing discussion mentions various parameters, including N1-N3, T1-T6, and P1-P2, and gives specific values for some of these parameters. The specific values given for these parameters are those used in the disclosed embodiment, but it is within the scope of the present invention to vary these parameters.

FIG. 5 is a flowchart showing in a different form the beacon sequence discussed above in association with FIG. 4. In FIG. 5, the microcontroller 63 of the beacon tag 12 enters block 131 in response to receipt of a valid signpost signal 24. Block 131 corresponds to time interval 111 in FIG. 4. In block 131, the beacon tag transmits a beacon signal with the power level P1 at a random time within each of N1 successive time slots that each have a duration T1.

The system then progresses to block 132 in FIG. 5 which corresponds to time interval 112 in FIG. 4. In particular, the beacon tag waits for a time interval T5, without transmitting any beacon signals. The system then progresses to block 133, which corresponds to time interval 113 in FIG. 4. In block 113, the beacon tag transmits a beacon signal with power level P1 at a random time within each of N2 successive time slots that each have a duration T2.

The system then progresses to block 134, which corresponds to time interval 114. In block 134, the system waits for a time interval T6 without transmitting any beacon signals, and then progresses to block 135. Block 135 corresponds to time interval 115 in FIG. 4. In block 135, the system transmits a beacon signal with power level P2 at a random time within each of N3 successive time slots that each have a duration P3.

From block 135, the system progresses to block 136, which corresponds to time interval 116 in FIG. 4. The system stays in block 136 indefinitely, until a further valid signpost signal is received. While in block 136, the beacon tag transmits a beacon signal with the power level P2 at a random time within each of a series of successive time slots that each have a duration of T4. If a further valid signpost signal is received, then the beacon tag immediately interrupts its activity in block 136 and returns to block 131, as indicated diagrammatically by the broken line 137, in order to again carry out the beacon sequence which is represented by blocks 131-135.

FIG. 6 is a high-level flowchart depicting the operation of the beacon tag 12. With reference to FIG. 1, the beacon tag 12 has a reduced power mode in which the transmitter 68 is off, the timer 66 is active, the receiver 62 is active, and the microcontroller 63 is in a reduced power or "sleep" mode, from which it can be awakened by either the receiver 62 or expiration of the timer 66. The flowchart of FIG. 6 begins at a point in time when the beacon tag 12 wakes up from the reduced power mode, either because the receiver 62 has received a signpost signal, or because the timer 66 has expired.

The microcontroller 63 of the tag 12 proceeds from block 151 to block 152, where it checks to see if the timer 66 has just expired. If not, then it knows that the receiver 62 has received a signpost signal, and it proceeds to block 153, where it extracts and stores the signpost code (42 in FIG. 2) from the received signpost signal. Then, control proceeds to block 156, where the beacon tag checks to see whether the received signpost signal also includes a command in either of fields 43 and 44 (FIG. 2). If so, then the tag proceeds to block 157, where it executes the command. Then the tag proceeds to block 158, where it returns to its reduced power "sleep" mode.

Looking again at block 156, if the beacon tag were to determine that the signpost signal did not include a command, then the beacon tag would have proceeded to block 161, where it resets the beacon sequence. This corresponds to the broken line 137 in FIG. 5, where the tag leaves the normal mode of operation represented by block 136, and returns to block 131 in order to carry out the special beacon sequence which is represented by blocks 131-135 in FIG. 5 and by time intervals 111-115 in FIG. 4.

Then, at block 162, the beacon tag determines the next point in time at which it needs to transmit its beacon signal according to the beacon sequence. Since the beacon sequence has just been restarted in block 161, this will be a determination of the point in time to transmit the beacon signal within the first time slot of the time interval 111 in FIG. 4. As discussed above, this will involve a random determination of a point in time within the time slot, for example using a pseudo-random technique of a known type. Once this point in time has been selected, the beacon tag 12 sets the timer 66 (FIG. 1) in block 163 of FIG. 6, so that the timer will expire at the proper point in time to allow transmission of the next beacon signal, and then the beacon tag 12 returns to the sleep mode at block 158.

Returning to block 152 in FIG. 6, if it had been determined that the microcontroller 63 was awakened from the sleep mode because the timer 66 expired, the microcontroller 63 would have proceeded from block 152 to block 167. In block 167, a determination is made of whether the timer expired because it is time to transmit the next beacon signal. If not, then the beacon tag proceeds directly to block 158, where it returns to the sleep mode. Otherwise, it proceeds from block 167 to 168, where it effects transmission of its beacon signal 72 (FIG. 1). It then proceeds to block 162, where it picks the transmit time for its next successive beacon signal. Then, at block 163, it sets the timer to expire at the point in time that it determined. Then, at block 158, it returns to the reduced power sleep mode.

At an earlier point in this discussion, in association with the discussion of FIG. 2, it was indicated that the command fields 43-45 would be described in due course. The following is a discussion of those fields.

The tag command field 43 is a 2-bit field which can be used to instruct a beacon tag 12 (1) to turn itself off (which is actually a low power sleep mode in which no beacon signals are transmitted), (2) to turn itself on (which is a mode in which beacon signals are transmitted in the manner described above in association with FIGS. 4-6), (3) to operate at a fast beacon rate, or (4) to operate at a slow beacon rate (where the slow rate uses a duration for each time slot T4 of FIG. 4 that is longer than the duration used for the fast rate).

Turning to the control command field 44 and the parameter field 45, it was mentioned above that the parameter field 45 contains a parameter needed to implement a command specified by the control command field 44. One command which can be specified in the control command field 44 is an instruction to the beacon tag 12 to set the beacon code that it puts into field 92 (FIG. 3), and in that case the parameter field 45 would contain the new beacon code. Another command which can be specified by the control command field 44 is an instruction to the beacon tag 12 to set a password or an encryption key used for security, as discussed above, and the parameter field 45 would contain the new password or encryption key. Yet another command which can be specified by the control command field 44 is an instruction to the beacon tag 12 to set the tag type code that it puts into field 88 (FIG. 3), or the asset type code that it puts into field 91, and the parameter field 45 would contain the new tag type code or asset type code. Still other commands in the control command field 44 could instruct the beacon tag to change any one of the various parameters discussed above in association with FIGS. 4 and 5, including P1, P2, N1, N2, N3, T1, T2, T3, T4, T5, and T6, and the parameter field 45 would contain the new value for the specified parameter. It will be recognized that there are still other commands which could be sent to the tag 12 using the control command field 44 and, where needed, the parameter field 45.

Referring again to FIG. 1, the reader 13 will now be described in greater detail. The reader 13 includes two antennas 211 and 212 which are of a known type, and which are each suitable for receiving UHF wireless signals. The reader 13 also includes two UHF receivers 213 and 214, which each have an input coupled to a respective one of the antennas 211 and 212. The reason that the reader 13 has two UHF antennas 211-212 and two UHF receivers 213-214 is that the antennas 211-212 are arranged to extend perpendicular to each other. The reader 13 is capable of determining which of the two antennas 211-212 is producing the strongest output in response to a given beacon signal 72. The reader 13 then selects the stronger output for use as the received version of that particular beacon signal.

The reader 13 also includes a decoder 217 of a known type, which has two inputs that are each coupled to an output of a respective one of the receivers 213-214. The decoder 217 processes the signals received by each of the receivers 213-214, in order to extract usable information therefrom, which can then be passed to a microcontroller 221 of the reader 13. A real time clock (RTC) circuit 222 is coupled to the microcontroller 221. Further, the reader 13 includes a network interface 223. A network 226 is of a type known in the industry as an Ethernet network, and couples the network interface 223 of the reader 13 to the control system 14, in order to facilitate communication between the reader 13 and the control system 14. The basic function of the reader 13 is to receive beacon signals 72 from various beacon tags (such as the tag 12), verify that each received beacon signal is valid, perform error detection and correction where needed, extract information such as one or more of the fields shown at 87-88, 91-93 and 96 in FIG. 3, and then pass this extracted information on to the control system 14.

Figure 7:
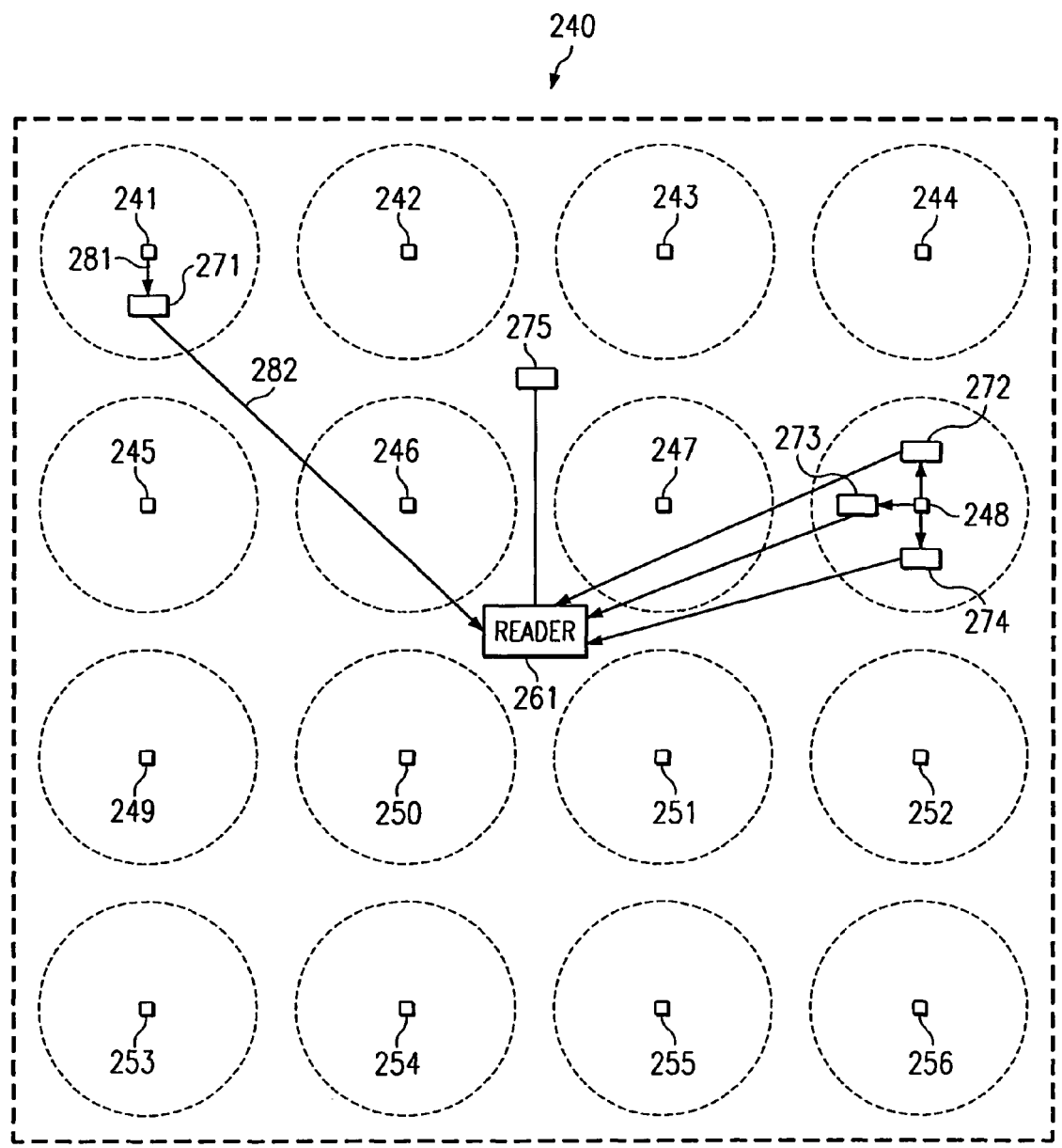
FIG. 7 is a diagrammatic top view of a system which represents one practical application for an apparatus of the type shown in FIG. 1.

FIG. 7 is a diagrammatic top view of a system 240 which represents one practical application of an apparatus of the type shown at 10 in FIG. 1. The system 240 of FIG. 7 includes a plurality of signposts, sixteen of which are shown at 241-256 in FIG. 7. Each of the signposts 241-256 is identical to the signpost shown at 11 in FIG. 1, except that they each use a respective unique signpost code 42 (FIG. 2). The signposts 241-256 have been given different reference numerals in FIG. 7 in order to facilitate a discussion of how the system 240 operates.

The signposts 241-256 are each stationarily mounted, for example on the ceiling of a warehouse or other industrial facility. The sixteen signposts 241-256 are arranged in a regular 4×4 array. The broken line circle which extends around each signpost in FIG. 7 is a diagrammatic representation of the effective outer limit of the transmission range of the signpost signals emitted by that signpost. As discussed above, each signpost has a limited transmission range of only about 12 feet or less, and the spacing between the signposts 241-256 has thus been intentionally selected so that no two signposts have overlapping transmission ranges. Although sixteen signposts 241-256 are shown in FIG. 7, this 4×4 array is just a portion of a much larger array that covers a much larger area. However, the array shown in FIG. 7 is sufficient for purposes of explaining certain principles of the present invention.

A reader 261 is stationarily mounted within the array of signposts 241-256, for example on the same ceiling that supports the signposts. The reader 261 is identical to the reader shown at 13 in FIG. 1, but is given a separate reference numeral here for clarity. The system 240 would actually include a number of other equivalent readers at spaced locations, but only one reader 261 is illustrated in FIG. 7 in order to facilitate a clear explanation of certain features of the invention.

Five beacon tags 271-275 are also depicted in FIG. 7. The beacon tags 271-275 are each effectively identical to the beacon tag shown at 12 in FIG. 1, but have been given separate reference numerals for clarity in the discussion which follows. For purposes of the following explanation, it is assumed that the beacon tags 271-275 are each mounted on a different mobile device, such as a container, a pallet, a forklift, a trailer which can support a container, a tractor which can pull a trailer, or some other type of mobile device.

Focusing first on the beacon tag 271, it will be noted from FIG. 7 that this tag is currently within the transmission range of the signpost 241. Consequently, the beacon tag 271 will be receiving signpost signals 281 from the signpost 241, and will be transmitting beacon signals 282 to the reader 261. The beacon signals 282 will include the beacon code unique to the beacon tag 271, as well as the signpost code unique to the signpost 241. Consequently, since this signpost code and this beacon code are received in combination with each other in the beacon signal 282, the control system associated with the reader 261 can determine that the beacon tag 271 is presently within the transmission range of the signpost 241. This in turn means that the mobile device which carries the beacon tag 271 is currently very close to the signpost 241. Since the control system knows the physical location of the signpost 241, the system can make a relatively accurate determination of the current location of the mobile device which carries the beacon tag 271, localized to the transmission range of the signpost 241. In particular, the system can determine the current location of the beacon tag 271 and its associated mobile device to an accuracy of about 12 feet, which is the radius of the transmission range of the signpost 241. It will be recognized that this capability is due in part to the fact that the signpost signals have a relatively local transmission range, whereas the beacon is signals have a transmission range which is about 30 times farther than the transmission range of the signpost signals.

For purposes of comparison, assume for a moment that the signposts 241-256 were all omitted from the system 240 of FIG. 7. In that case, the beacon signals 282 from the beacon tag 271 would each include the unique beacon code of the tag 271, but would not include any signpost code. By analyzing the strength of the beacon signal 282, as received at the reader 261, the control system associated with the reader 261 could make a very rough estimate of the distance between the tag 271 and reader 261. However, it would be difficult for the control system to accurately determine which direction the beacon signal 282 came from. In this regard, even though the reader 261 has two orthogonal antennas (equivalent to those shown at 311-312 in FIG. 1), the reader 261 would not know whether the beacon signal 282 arrived from one direction, or from a diametrically opposite direction.

Still assuming that no signposts are present in the system, but that a second reader is provided in a manner so that both readers receive the beacon signals 282, the control system could estimate the distances from the beacon tag 271 to each of the two readers. With this information, it would be possible to carry out a standard triangulation calculation in order to attempt to estimate the location of the beacon tag 271. But due to rather wide tolerances in the ability to estimate distances from the beacon tag to each reader based on beacon signal strength, even triangulation produces only a very coarse estimate of location, which is not particularly accurate and reliable. It will thus be recognized that, through use of the signposts 241-256 in FIG. 7, a significantly more accurate and reliable determination can be made of the current location of the beacon tag 271.

In FIG. 7, the mobile device associated with the beacon tag 275 is currently in a location where the beacon tag 275 is not within the transmission range of any of the signposts 241-256. Thus, the reader 261 is receiving a beacon signal from the beacon tag 275, but the beacon signal includes only the beacon code of the tag 275, and does not include a signpost code from any of the signposts 241-256. Therefore, the tag 275 is temporarily situated where the system cannot determine its location as accurately as if it were currently within the transmission range of any of the signposts. Nevertheless, the system 240 may still have a relatively accurate idea of the current location of the tag 275, by tracking it over time.

For example, the system may know that the tag 275 reached its current location by moving through the transmission range of signpost 243 and then through the transmission range of signpost 242, and the system may thus predict that the tag 275 will soon enter the transmission range of signpost 245. Therefore, even though tag 275 is not currently within the transmission range of any signpost, the system still has a better idea of the current location of the tag 275 than would be the case if there were no signposts at all. A further consideration in this regard is that, within a warehouse or other industrial facility, there are often defined paths that mobile devices tend to follow through the facility. Accordingly, the system may be well aware that there is a defined path which extends successively past signpost 243, signpost 242, and signpost 245. This will provide the system with an even better ability to accurately estimate the current location of tag 275, even when it is not currently within the transmission range of any of the signposts 251-256.

It is possible for two or more beacon tags to be simultaneously within the transmission range of a single signpost, such that all of those beacon tags are simultaneously receiving the same signpost signal emitted by that signpost. This is the case with beacon tags 272-274 in FIG. 7, which are all within the transmission range of the signpost 248. The reader 261 receives a separate beacon signal from each of the tags 271-274, and each of these beacon signals includes the unique beacon code of the corresponding beacon tag, in combination with the signpost code of the signpost 246. Thus, the control system associated with reader 261 can distinguish the beacon tags 272-274 from each other, due to their unique beacon codes, and can also determine that all of these beacon tags are currently at locations within the transmission range of the signpost 248.

Figure 8:
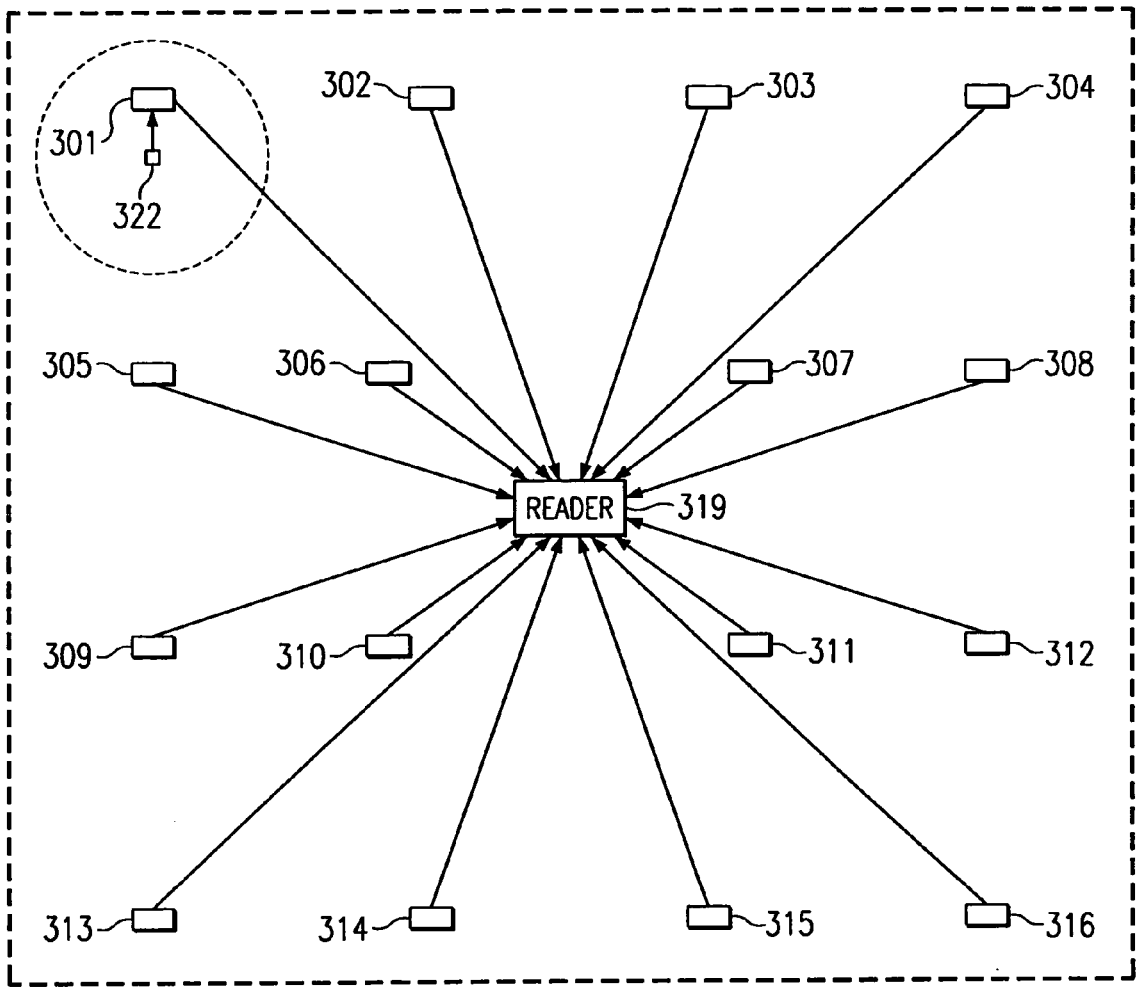
FIG. 8 is a diagrammatic top view similar to FIG. 7, but showing a system which represents another practical application for an apparatus of the type shown in FIG. 1.

Although FIG. 7 shows an array of signposts 241-256 which are stationary, and several beacon tags 271-275 which are mobile, the stationary and mobile characteristics of the signposts and beacon tags can be reversed. In this regard, FIG. 8 is a diagrammatic top view of a system 300 which has sixteen stationary beacon tags 301-316, each of which is equivalent to the beacon tag 12 of FIG. 1. These beacon tags are arranged in a 4×4 array, with spacing equivalent to that used for the signposts 241-256 in FIG. 7. A reader 319 is provided at a central location within the array, and is also stationary. A signpost 322 is mounted on a mobile device, which can move within the facility, and thus can move with respect to the stationary beacon tags 301-316. At the point in time depicted in FIG. 8, the mobile device carrying signpost 322 is at a location near the beacon tag 301, such that the beacon tag 301 is within the transmission range of the signpost 322.

The signpost 322 is transmitting a signpost signal, but the only beacon tag which can currently receive that signal is the beacon tag 301. Thus, the beacon tags 301-316 are each transmitting a respective beacon signal to the reader 319, and each of these beacon signals includes a unique beacon code, but only the beacon signal from the tag 301 also includes the unique signpost code that it is receiving in the signpost signal from the signpost 322. The control system associated with the reader 319 will know the physical location of each of the stationary beacon tags 301-316. Thus, the location of the mobile device associated with the signpost 322 can be determined with the same degree of accuracy achieved in the system of FIG. 7, because the control system for the embodiment of FIG. 8 knows that the distance between the signpost 322 and the beacon tag 301 must be less than the radius of transmission of the signpost signals from signpost 322, or in other words approximately 12 feet. If the signpost 322 moves until it is close to the beacon tag 302, then the beacon tag 301 will no longer be within the transmission range of the signpost signals from signpost 322, but the beacon tag 302 will be within that transmission range. Consequently, the beacon tag 301 will stop transmitting the signpost code from signpost 322 in its beacon signal, and the beacon tag 302 will start transmitting this signpost code in its beacon signal. As a result, the control system associated with reader 19 can track the movement of the mobile device associated with signpost 322.

One difference between the systems of FIGS. 7 and 8 is that, since the beacon signal from any beacon tag is configured to include only one signpost code, each beacon tag should never be within the transmission range of more than one signpost at any given point in time. In the system of FIG. 7, this is assured by the stationary mounting of the signposts 241-256, with appropriate spacing provided between them. In contrast, since the signposts can move in the system of FIG. 8, care must be taken to ensure that two or more signposts do not come into proximity with the same beacon tag at the same point in time. This is not to suggest that the approach of FIG. 7 is more advantageous than the approach of FIG. 8. One of these approaches may be better for some applications, and the other may be better for other applications. In fact, it should be evident from the discussion which follows that, in some applications, it would be possible to use a combination of the two approaches.

Certain additional aspects of the present invention will be discussed below. It is believed that these additional aspects will be more clearly understood if presented in the context of an example of a specific application. Therefore, the discussion which follows will focus on a private company which is in the business of overnight package delivery. As is well known, companies of this type provide a service in which they pick up a package from a sender on one day, and then deliver it to a recipient on the following day, typically before noon. The sender may be in one city, such as Boston, and the recipient may be a different city, such as Tucson.

On the day that a package is picked up in Boston, the company will also typically pick up a number of other packages in Boston, which will be going to a variety of other cities throughout the country. The following day, the company will have a number of packages to deliver in Tucson, which were picked up the preceding day in a number of different cities across the country. In order to efficiently handle the routing of all these packages, existing companies typically provide some form of hub facility at a major airport. During the night, a container will arrive from a city such as Boston, containing a number of packages that need to be delivered in many different cities. The container will be unloaded at the hub facility, and then the packages will be sorted, in order to group the sorted packages by destination city. Thus, for example as to Tucson, the sorting process will yield a group of packages destined for delivery in Tucson, which arrived at the hub facility in a variety of different containers from a variety of different cities of origin. The group of packages destined for Tucson will be packed into a container, and that container will be transported to Tucson, where the packages will be delivered locally.

Figure 9:
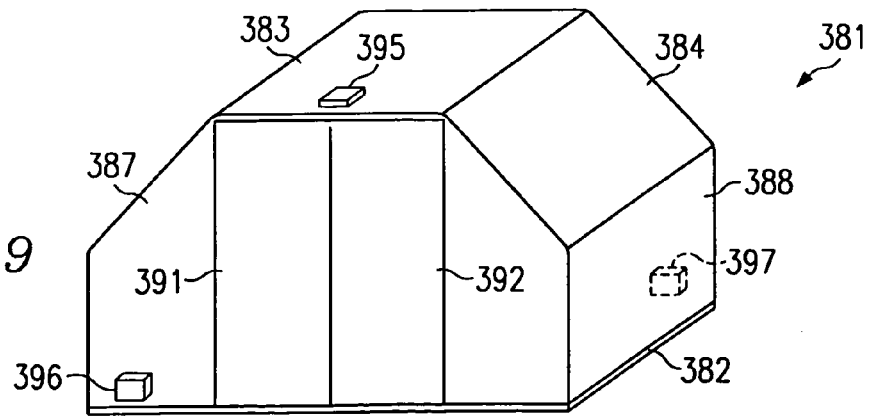
FIG. 9 is a diagrammatic perspective view of one type of container which can be used in association with the invention, and which bears three beacon tags of the type shown in FIG. 1.

With respect to a hub facility of the type discussed above, the majority of containers will typically arrive in one of two different ways. First, containers from cities that are not too far from the hub facility will typically arrive by highway, in various types of trucks. These trucks are commonly referred to as feeders. The containers from more remote cities will typically arrive by airplane. The shapes and sizes of the containers is which arrive by airplane and by truck can vary widely. FIG. 9 is a diagrammatic perspective view of one type of container 381 which is particularly suitable for use in airplanes, because it has a shape which facilitates packing of a number of such containers into the somewhat rounded shape of an airplane body.

The container 381 of FIG. 9 has an approximately square bottom wall 382, and a top wall defined by a horizontal central portion 383, and two angled portions which extend downwardly at an incline from opposite sides of the portion 383, one of the angled portions being visible at 384. The container 381 has four side walls which each extend vertically upwardly from an edge of the bottom wall to an edge of the top wall, and two of these side walls are visible at 387 and 388 in FIG. 9. The container 381 also has two doors 391 and 392, which can each pivot between an open position and a closed position. A not-illustrated latch is provided for securing the doors 391-392 in a closed position, and is configured in a known manner to permit the doors to be locked or sealed in their closed positions, so that packages cannot be removed by unauthorized individuals as the containers are being transported to or from the hub facility.

The container 381 is itself a known device. According to the invention, three beacon tags 395-397 are fixedly secured to the container 381 at spaced locations thereon. Each of the tags 395-397 is equivalent to the tag 12 of FIG. 1. The tag 395 is provided on the central portion 383 of the top wall of the container. The tags 396 and 397 are provided on respective opposite sidewalls of the container 381, closely adjacent diagonally opposite corners of the bottom wall 382. The various types of containers which travel to and from the hub facility by truck and plane can each be referred to as a unit load device (ULD). The container 381 of FIG. 9 is one example of a ULD.

Figure 10:
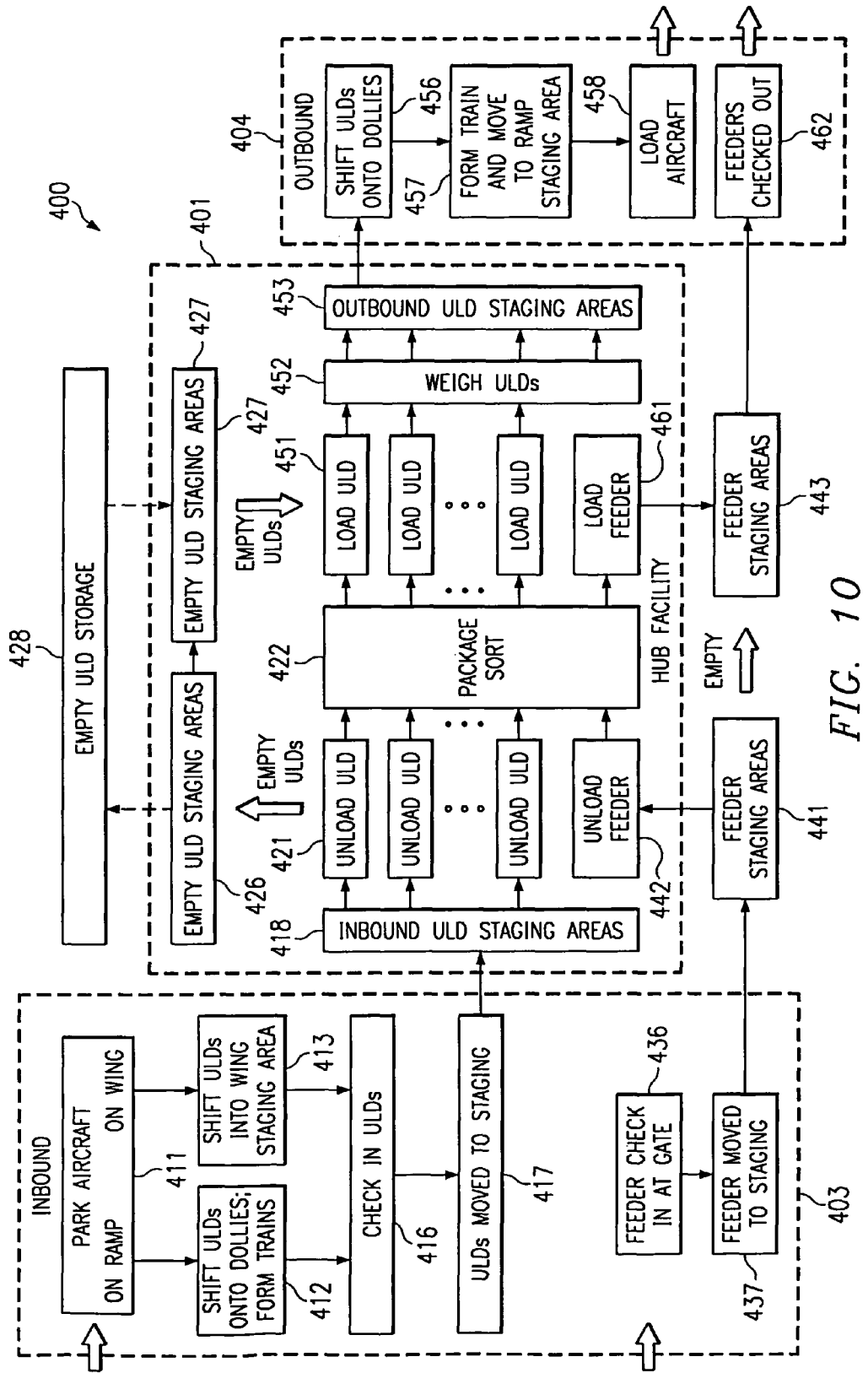
FIG. 10 is a diagrammatic top view of an installation which represents one example of a practical application of a system of the type shown in FIG. 1.

FIG. 10 is a diagrammatic top view of an installation 400 which includes a hub facility 401 of the type discussed above. In the hub facility 401, packages being transported by an overnight delivery service are received from many cities of origin, unpacked, sorted, repacked, and then transmitted to many destination cities. That is, the hub facility 401 in FIG. 10 is essentially a building where packages are unloaded from containers, sorted, and then reloaded into other containers. The overall installation 400 includes an inbound section 403 and an outbound section 404, which are both external to the physical building of the hub facility 401. The inbound section 403 relates to receipt and initial processing of incoming containers, and the outbound section 404 deals with the processing of outgoing containers.

A tracking system of the general type discussed above in association with FIG. 7 is used for the installation 400, but for clarity is not shown in FIG. 10. This tracking system includes a plurality of spaced signposts mounted on the ceiling of the hub facility 401, and at selected other locations throughout the installation 400, as discussed below. Further, a plurality of readers are provided throughout the installation 400. In the hub facility 401, the readers are mounted on the ceiling. In the inbound and outbound sections, there are readers mounted at entrance and exit gates, on or near unloading equipment, on light poles, on buildings, on fences, on special supports, or on other suitable structure which may be present. In general, the signposts are provided in areas where very accurate estimates of tag location are needed, using techniques of the type discussed above in association with FIG. 7. In contrast, in areas where a coarser estimate of tag location is sufficient, signposts can be omitted so that beacon signals do not include signpost codes, and estimates of location can be based on the strength of beacon signals as received at the readers.

Turning in more detail to the flow of materials through the installation 400, an arriving airplane taxis to the inbound section 403, where it is parked at 411. The airplane may be parked at one of two different types of locations. One is commonly referred to as an "on wing" location. This means that the aircraft is parked closely adjacent a building, which typically has a built-in loader or unloader that can be extended to a door of the plane in order to facilitate loading and unloading. The other type of location is known as an "on ramp" location. This means that the airplane is parked on the tarmac at a location spaced from any building. Loading and unloading of such a plane are carried out using know types of mobile loaders and unloaders that can travel out to the airplane and then back to a building.

It is a governmental requirement that most electronic devices which are traveling on airplanes must be disabled during the flight, so that they do not produce any type of wireless electromagnetic signal which might interfere with the operation of the plane. Thus, to the extent that any signpost or beacon tags of the type shown at 11-12 in FIG. 1 are traveling by airplane, they must be turned off during the flight, or at least must be in an operational mode where they do not transmit electromagnetic signals. As discussed above, beacon tags 395-397 are provided on ULDs of the type shown at 381 in FIG. 9. Consequently, when these ULDs are unloaded from an airplane, the beacon tags need to be turned on. As discussed above, the tag command field 43 (FIG. 2) of a signpost signal can turn a beacon tag on or off. Consequently, stationary signposts can provided on or near each unloading device, or in the region of the airplane unloading operation, in order to turn on all of the beacon tags which are present on the ULDs that are being unloaded. Alternatively, a handheld signpost could be manually used by an operator to turn on all of the beacon tags which are on the equipment being unloaded. The beacon tags on the unloaded ULDs thus begin transmitting their beacon signals.

As noted above, the inbound section 403 has a plurality of readers of the type shown at 13 in FIG. 1, at appropriately selected locations throughout the inbound section 403. These readers be provided on or near the airplane unloading equipment, on light poles, on buildings, on fences, on special supports, or on other structure. The beacon signals generated by the tags on each ULD will be received by one or more of these readers, which each will forward the received information to a central control system of the type shown at 14 in FIG. 1. Since the control system knows which beacon tags are mounted on which ULDs, the control system can determine which ULDs have arrived by airplane. The control system can then begin planning how to route each ULD through the installation 400.

In this regard, there are occasional situations in which a ULD comes from an origin city which has so many packages going to a single destination city that all of these packages have been packed into a single ULD. In that case, the control system can arrange for the ULD to be transferred directly from the inbound section 403 to the outbound section 404, because there is no need to do any unpacking, sorting or repacking. However, the vast majority of ULDs will need to be unpacked and sorted, and thus will need to be routed to the hub facility 401.

As to all arriving ULDs, the control system will have electronically received from each origin city an identification of the ULDs being sent, and a list of the specific packages in each such ULD. Thus, depending on the departure schedules for planes traveling to destination cities, the control system can prioritize the order of handling arriving ULDs, so that the ULDs containing packages that need to be on the earliest departing flights can be handled before ULDs which do not contain packages that need to be on the earliest departing flights. Based on the electronic information received from origin cities, the control system knows which ULDs should be on each arriving plane, and can determine whether one of the expected ULDs is missing, or whether an extra and unexpected ULD is present. The arrival time of each ULD can also be recorded.

When the plane is parked on ramp, ULDs can be transported to the hub facility using a train which includes several releasably coupled trailers or "dollies", and a tractor or tug which can pull the trailers. Each ULD can be transferred to a respective trailer of the train. A train of this type is described in more detail later. In FIG. 10, block 142 reflects this transfer of ULDs onto trailers. The train then transports the ULDs to the hub facility 401. In contrast, if the plane is parked on wing, the ULDs may or may not be transferred to a train of this type. They may instead be transported by conveyor, by a device such as a cart which can be manually pushed, or by some other transport apparatus. Block 413 in FIG. 10 represents the transfer of ULDs from the plane to some form of appropriate device that will facilitate transport of the ULDs.

At block 416 in 403, each arriving ULD is manually checked against the manifest for the arriving flight. Then, at block 417, the ULDs destined for the hub facility are moved to the hub facility. As mentioned above, readers are provided at selected locations throughout the installation 400, including the inbound section 403, the hub facility 401, and the outbound section 404. Further, signposts of the type shown at 11 in FIG. 1 are provided at a variety of selected locations throughout the installation 400, especially at locations which the ULDs must travel past as they are routed through the installation 400. Thus, for example, signposts are provided along typical paths of travel, at doorways, and at various stations where ULDs can temporarily wait for attention, which are referred to as "staging" areas. Using the basic approach discussed above in association with FIG. 7, the control system can accurately track each ULD throughout the entire installation 400.

The ULDs from the staging area 418 are each eventually transported to one of several unloading stations 421. At each unloading station, an operator opens the ULD, and also presses a push button on an adjacent control panel, in order to indicate to the control system that the unloading process has started. The operator then unloads all of the packages from the ULD, by placing them on conveyors which carry them to a package sort section 422. When the operator finishes unloading a ULD, the operator presses a further button on the control panel, to indicate to the control system that the manual unloading process has been completed. In the disclosed embodiment, the control panel at each unloading station is a physical part of the unloading station. However, it can alternatively be provided in the form of a portable wireless device carried by the operator. The empty ULDs are each taken to a staging area 426, and are eventually moved to a staging area 427, either directly or through a further staging area 428, which is outside the physical building of the hub facility 401.

Referring again to the inbound section 403, and as discussed above, packages can arrive not only by airplane, but also by truck. As noted above, the trucks are referred to as feeders. The feeders can contain ULDs, in which case the ULDs can be unloaded and handled in a manner very similar to that discussed above in association with an arriving airplane which is parked on ramp. More typically, however, the feeders include packages which are not packed in ULDs. In that case, the feeder itself is treated as the container for the packages, and the lower portion of FIG. 10 addresses how this type of feeder is handled.

In particular, at block 436 the feeder is checked in at the gate of the inbound section 403. A temporary beacon tag similar to that shown at 12 in FIG. 1 is attached to the feeder, for example using some special mounting bracket. At the same time, the person attending the gate makes an entry in a computer, which advises the central control system of the arrival of the feeder, and also advises the control system of the particular beacon tag which has been attached to that feeder, in order to permit the control system to associate the electronic manifest for that feeder with the actual physical feeder as it moves through the installation 400.

If the feeder is a truck in the form of a cab pulling a trailer, commonly known as a tractor-trailer combination, the trailer may be separated from the cab and moved through the installation 400 using small local tractors of a type commonly referred to as yardbirds. On the other hand, if the cab is an integral part of the feeder, the entire track may move through the installation 400.

In any event, at block 437 the feeder is moved from the inbound section 403 to a staging area 441 that is adjacent to but outside of the building that serves as the hub facility 401. The control system schedules these feeders for movement to feeder unloading stations, one of which is shown at 442. Each feeder is unloaded, in a manner similar to that described above for the ULD unloading stations 421. The packages removed from the feeders travel to the package sort section 422, for example by conveyor, while the empty feeders are routed to an empty feeder staging area 443.

In the package sort section 422, all packages that are intended for a given destination city are routed to a selected one of several loading stations 451. An empty ULD is taken from the staging area 427, and is loaded with packages headed for that destination city, either until the ULD is full or until it contains all of the packages bound for that destination city. Then, that ULD is transferred to a ULD weigh scale section 452, where each ULD is weighed. The weigh scale 452 is coupled to the central control system, so that the control system will know the weight of each loaded ULD, and thus can carry out appropriate planning with respect to how much total weight is being loaded on each departing airplane.

After each ULD has been weighed at 452, it is moved to an outbound staging area 453. From there, it is in due course moved out of the building through a door having a signpost nearby, and the control system is notified of its exit from the hub facility 401 by virtue of beacon signals which are from a tag on the ULD and which include the signpost code of the signpost. Then, as represented diagrammatically by blocks 456, 457 and 458, these ULDs are transported by trains of the type discussed earlier to the outbound section 404, where each is loaded on an airplane traveling to the destination city for all of the packages within that ULD.

As mentioned above, government regulations prohibit devices such as beacon tags from emitting wireless electromagnetic signals during airplane flight. Accordingly, as each ULD is loaded on a plane, all of the beacon tags associated with it are turned off, or at least placed into a mode in which they do not emit any beacon signals. This can be effected using a stationary signpost in the region of the loader for the airplane, or using some form of portable signpost operated by a person involved with the loading process. As noted above, one of the commands which can be present in the tag command field 43 (FIG. 2) of a signpost signal is a command which turns off any beacon tag that receives the signal. When an airplane has been loaded with all of the ULDs it is scheduled to carry, the airplane taxis out of the outbound section 404, and then takes off for its destination city.

Some of the packages sorted in the sort section 422 are scheduled to depart by truck rather than airplane, for example where they are to be delivered to destinations that are not far from the installation 400. The sorting process routes these packages to feeder load stations, one of which is shown at 461. An empty feeder from the feeder staging area 443 is moved to one of the feeder load stations 461, where it is loaded with sorted packages that it is carry to one or more relatively local delivery centers. The loaded feeder is then moved from the hub facility 401 to the outbound section 404, where the temporary beacon tag on that feeder is removed, and an appropriate entry is made in a terminal coupled to the control system. The feeder then leaves the outbound section 404. In this regard, if the feeder is a trailer being moved by a yardbird, it is detached from the yardbird and coupled to an available cab, and the cab then pulls it to its destination.

Figure 11:
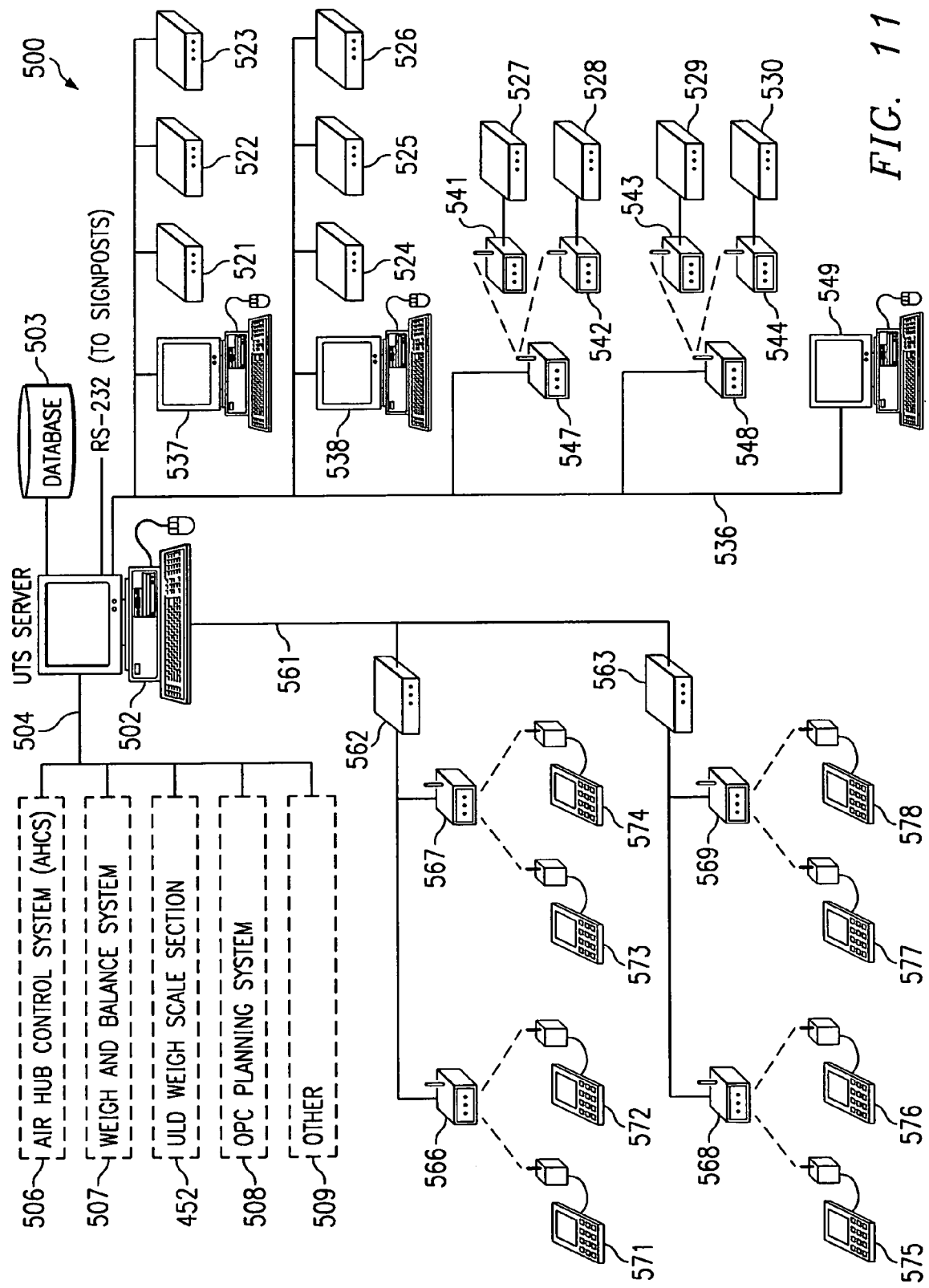
FIG. 11 is a diagrammatic view of selected portions of a system which embodies the invention and which is suitable for use in association with the installation of FIG. 10.

As mentioned above, the system which tracks ULDs and feeders through the installation 400 is not shown in FIG. 10. This system is referred to as a ULD Tracking System (UTS), and FIG. 11 is a diagrammatic view of selected portions of this UTS system, which is designated generally in FIG. 11 with reference numeral 500. In more detail, the UTS system 500 includes a UTS server 502, the hardware of which is a suitable computer system of a commercially available type. The server 502 is associated with a database 503, which may be stored on a hard disk of the server 502 itself, or in some type of physically separate storage device that is operatively coupled to the server 502. The system 500, including the server 502, is fault tolerant in the disclosed embodiment, including the provision of a degree of redundancy, in order to permit the system to automatically reconfigure itself in a known manner so as to work around localized faults that may occur. In this regard, it will be recognized that, since all of the packages being handled in the installation 400 absolutely have to be delivered the following day, it is simply unacceptable for a failure within the system 500 to bring the operation of the installation 400 to a halt. The techniques used to obtain fault tolerant capability are of a known type, and are therefore not disclosed here in detail.

The server 502 is interfaced at 504 to several other systems, which technically are not part of the UTS system 500 itself, and they are therefore shown in broken lines in FIG. 11. One is the ULD weigh scale section 452, which was mentioned above in association with FIG. 10. Another is an air hub control system (AHCS) 506, which is a separate computer system that provides overall control for the installation 400 of FIG. 10, including functions other than tracking of feeders and ULDs within the installation 400. The server 502 is also coupled to a weigh and balance system 507, and an operation planning and control (OPC) system 508. The server 502 could also be optionally coupled to some other type of computer system 509 used at the facility 400.

Turning in more detail to the UTS system 500, and as mentioned above, there are a plurality of readers which are each equivalent to the reader shown at 13 in FIG. 1. Ten of these readers are shown at 521-530 in FIG. 11, but this is merely a representative sample of the total number of readers provided throughout the entire installation 400. Six readers 521-526 from this group are each coupled to the server 502 through wires of a network 536. In the disclosed embodiment, the network 536 is of a type commonly known in the art as an Ethernet network. Two reader controllers 537-538 are also coupled to the network, to facilitate communications between the server 502 and the readers. The structure and operation of the reader controllers 537-538 are known to those skilled in the art, and therefore not described here in detail.

The remaining readers 527-530 in FIG. 11 are not coupled directly to the network 536. Instead, each is coupled to a respective wireless receiver/transmitter 541-544, each of which communicates through wireless signals with a respective one of two additional wireless receiver transmitters 547-548, which serve as access points to the network 536. These wireless links conform to a known standard which was propagated by the Institute of Electrical and Electronic Engineers, and which is commonly known as the IEEE 802.11 standard. Since persons skilled in the art are already familiar with this standard, a detailed discussion of it is unnecessary here.

The readers 521-526 which are coupled directly to wires of the network 536 are likely to be readers provided within the physical building of the hub facility 401, whereas the readers 527-530 which are coupled to the network 536 by wireless links 541-544 and 547-548 are more likely to be the readers which are in the inbound section 403 and the outbound section 404. This is because the additional expense of the wireless equipment is more likely to be cost effective in exterior locations, where some significant cost would be involved in running wires to isolated locations. However, the present invention does not preclude the use of wireless links within the building of the hub facility 401, or the use of direct network connections at locations outside the hub facility 401.

In FIG. 11, a choke point reader system 549 is coupled to the network 536. It can cooperate with at least some of the readers 521-530, in order to provide an immediate and accurate log of the specific time and location when a beacon tag passed a certain spot referred to as a "choke point". A choke point is a location which many or all of the beacon tags must pass, one example being a doorway through which all ULDs must pass in order to enter the hub facility 401. The reader system 549 ensures that an accurate log of the time and location is immediately recorded, because the server 502 will sometimes be too busy with other tasks to respond sufficiently quickly to accurately record the time and location. To the extent that the choke point reader system 549 collects information, it passes the information on to the server 502 in due course.

Server 502 is also coupled through a further network 561 and two network controllers 562-563 to several wireless base stations, four of which are shown at 566-569. Base stations of the type shown at 566-569 are provided throughout the installation 400, and permit the server 502 to communicate in a wireless manner with several wireless handheld devices 571-578. The handheld devices 571-578 each include a keypad and a display, and are used for various purposes.

One such purpose is to permit persons throughout the facility to obtain information about a ULD, a mobile device or some other item associated with a given tag. The control system 14 maintains information in an electronic form about the items associated with each tag, and can thus easily provide pertinent portions of this information on request to any of the handheld devices 571-578. Similarly, the control system could be configured to provide this information through the Internet to a standard "web browser" program Another purpose of the handheld devices 571-578 is to permit the server 502 to issue instructions to persons who are working within the installation 400. For example, a person operating a mobile device such as a forklift transporting a ULD may need to be given instructions regarding what he or she should do with the ULD. In this regard, if the ULD is to be taken to one of the unloading stations 421 (FIG. 10), the operator needs to know which specific unloading station the ULD should be delivered to. Similarly, if a ULD is waiting in a staging area, and the operator is to pick it up, the operator needs to know which specific ULD to pick up. The server 502 can convey this information to the operator through one of the handheld devices 571-578 carried by that operator.

The handheld devices 571-578 also have the capability to function as beacon tag readers. This permits an operator, with or without help from the server 502, to identify whether a particular ULD near the operator is a ULD which the system wants the operator to do something with.

The handheld units 571-578 can also be used by an operator to notify the server 502 of equipment which the operator is currently using. For example, if the operator takes control of a yardbird in order to move feeders around the installation 400, identification codes for the operator and the yardbird can be entered manually on the keypad, or can be scanned in an appropriate manner such as by scanning bar codes on the yardbird and on the operator's badge with a bar code scanner in the handheld device, so that server 502 knows which equipment that particular operator is currently using. The server 502 can then use that handheld device to give the operator specific instructions regarding what the operator should do with that piece of equipment.

Figure 12:
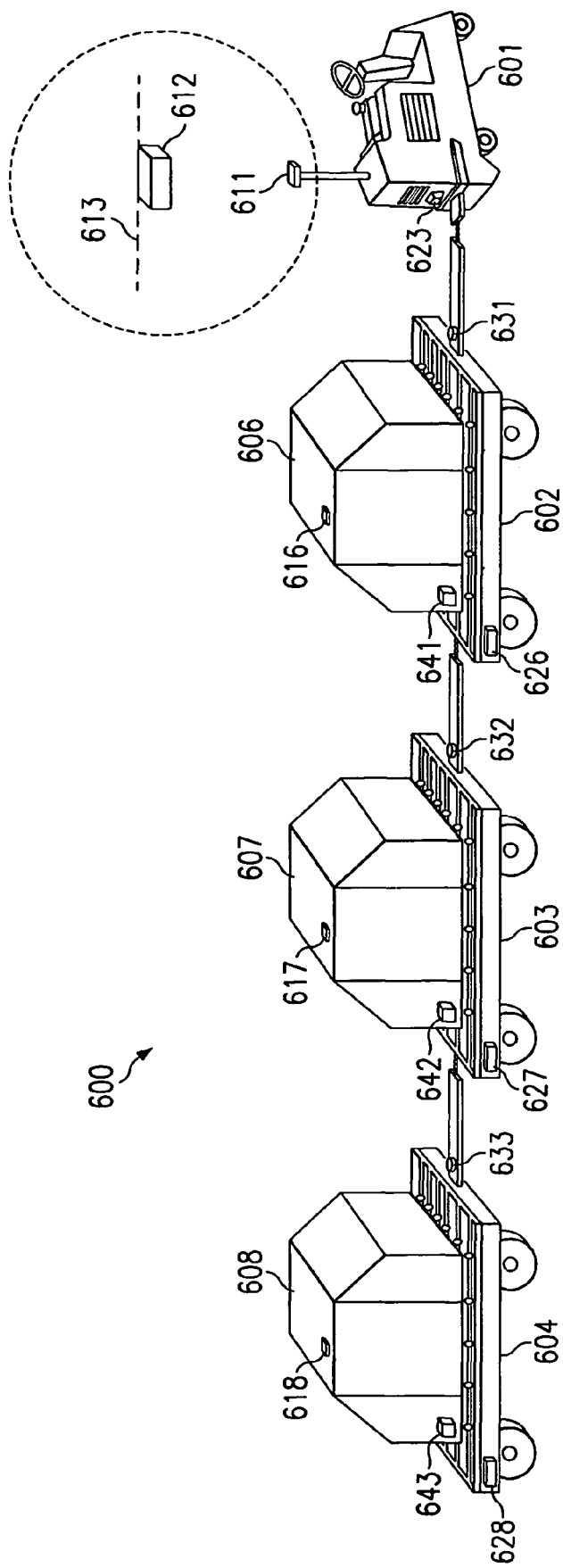
FIG. 12 is a diagrammatic view of a train which includes a tractor, three trailers, and a container on each trailer, and which embodies certain aspects of the present invention.

FIG. 12 is a diagrammatic view of a train 600, which is of a type that has been mentioned above, and which can be used to transport ULDs within the installation 400 of FIG. 10. The train 600 of FIG. 12 includes a tractor or tug 601 which pulls the train, and three trailers or dollies 602-604. The tractor 601 and trailers 602-604 are each a type of mobile device.

The trailers 602-604 are all identical. The trailer 602 has at its forward end a tongue, which is releasably coupled to a hitch at the rear of the tractor 601. The trailer 603 has at its forward end a tongue which is releasably coupled to a hitch at the rear of the trailer 602, and the trailer 604 has at its forward end a tongue which is releasably coupled to a hitch at the rear of the trailer 603. Although the train 600 of FIG. 12 has three trailers, it will be recognized that the number of trailers could be larger or smaller. Each of the trailers 602-604 has a respective ULD 606-608 removably supported thereon. The ULDs 606-608 are each identical to the ULD 381 discussed above in association with FIG. 9.

The tractor 601 has thereon a beacon tag 611, which is provided at the top of a post in order to elevate the beacon tag 611 so that is relatively close to the signposts provided on the ceiling, one of which is shown at 612 on a ceiling shown diagrammatically as a broken line 613. The broken line circle around the signpost 612 represents the transmission range of the signpost 612. It should be noted that the transmission range of the signpost 612 is specifically configured so that the trailers 602-604 will pass below the lower portion of the transmission range of the signpost 612. Three beacon tags 616-618 are each provided on top of a respective one of the ULDs 606-608.

As the tractor 601 moves through the installation 400, the beacon tag 611 thereon will move into and out of the transmission ranges of various signposts throughout the facility, thereby permitting the location of the tractor 601 to be accurately tracked in the manner described above in association with FIG. 7. The beacon tags 616-618 provided on top of the respective ULDs 606-608 will also pass through the transmission ranges of various signposts, thereby facilitating direct and accurate tracking of the location of each of the ULDs 606-608.

The tractor 601 has a signpost 623 located near the hitch on its rear. The trailers 602-603 each have a respective signpost 626-628 on a right rear corner thereof. The trailers 602-604 also each have a respective beacon tag 631-633 supported on the tongue thereof. As discussed above, the signposts on the ceiling, such as the signpost 612, each have a transmission range which ends at a height vertically above the trailers. Thus, the beacon tags 631-633 on the tongues of the trailers do not pass through the transmission ranges of the signposts on the ceiling.

The beacon tag 631 on the tongue of the trailer 602 is within the transmission range of the signpost 623 on the rear of the tractor 601, but is outside the transmission range of the signpost 626 disposed on the same trailer 602, because the beacon tag 631 and the signpost 626 are near opposite ends of the trailer 602. Similarly, the beacon tag 632 on the trailer 603 is within the transmission range of the signpost 626 at the rear of the trailer 602, but is outside the transmission range of the signpost 627 at the rear end of the trailer 603. Further, the beacon tag 633 on the trailer 604 is within the transmission range of the signpost 627 at the rear of the trailer 603, but is outside the transmission range of the signpost 628 which is at the rear of the trailer 604.

With this in mind, it will be recognized that, while the tractor 601 and the trailer 602 are releasably coupled to each other, the beacon tag 631 on the trailer will periodically transmit a beacon signal which includes its own unique beacon code and which also includes the unique signpost code of the signpost 623 on the tractor 601. Thus, based on beacon signals from the tag 631, the server 502 (FIG. 11) will know that the trailer 602 is currently coupled directly to the tractor 601.

Similarly, the beacon signals from tag 632 advise the system that the trailer 603 is currently coupled directly to the trailer 602. Also, the beacon signals from the tag 633 advise the system that the trailer 604 is currently coupled directly to the trailer 603. With all of this information, the control system knows not only that the tractor 601 and the trailers 602-604 are all currently coupled together to form the train 600, but also knows the precise order in which they respectively appear in the train from the front to the rear. That is, the control system knows that the tractor 601 precedes the trailer 602, which in turn precedes the trailer 603, which in turn precedes the trailer 604. As trains are assembled and disassembled, in order to meet the varying needs of the facility, the control system always has direct immediate knowledge of exactly which tractor and trailers are combined to form any particular train.

As discussed above in association with the ULD 381 of FIG. 9, the ULDs 606-608 each have two additional beacon tags attached to a lower portion thereof, on opposite sidewalls near diagonally opposite corners of the bottom wall. One such beacon tag is visible in FIG. 12 on each of the ULDs 606-608, and these tags are respectively identified with reference numerals 641-643.

The beacon tag 641 on the ULD 606 is within the transmission range of the signpost 626 on the trailer 602 which carries that ULD. The tag 641 thus transmits a beacon signal which includes its own unique beacon code, and also the unique signpost code for the signpost 626. Thus, the control system knows that the ULD 606 is currently supported on the trailer 602. In a similar manner, the beacon tags 642 and 643 transmit respective beacon signals which include respective signpost codes from the signposts 627 and 628, and which respectively advise the control system that the ULDs 607 and 608 are respectively supported on the trailers 603 and 604. The beacon tags 641-643 are sufficiently low on the ULDs 606-608 that they pass below the transmission ranges of the signposts which are on the ceiling 613, such as the signpost 612.

If the ULD 606 had been placed on the trailer 602 with an orientation rotated 180° about a vertical axis from the orientation shown in FIG. 12, then the beacon tag 641 would be near the front left corner of the trailer 602, and the third beacon tag on the ULD 606 (which is not visible in FIG. 12) would be near the signpost 626 on the right rear corner of the trailer 602. That third beacon tag would thus carry out the function of transmitting beacon signals which contain the signpost code of signpost 626 and which advise the control system that the ULD 606 is currently supported on the trailer 602. With the ULD 606 in this alternate position, the beacon tag 641 would be outside the transmission ranges of the signposts 623 and 626, and thus would not include any signpost code in its beacon signal. Consequently, by providing two beacon tags at diagonally opposite locations on the lower portion of each ULD, each ULD can be placed on a trailer with either of two different orientations, and it is thus not necessary for employees of the facility to be concerned about ensuring a particular orientation of each ULD when it is placed on a trailer.

The control system knows the location of the tractor 601 by virtue of the beacon signals issued by the beacon tag 611 on the tractor 601, which typically include the signpost code of one of the signposts on the ceiling, such as the signpost 612. Further, since the control system also knows which trailers are currently coupled to the tractor 601, and in what order, the system also knows the location of each of the trailers 602-604 which are coupled to the tractor 601 as the tractor 601 moves through the installation shown in FIG. 10. Further, the system knows the location of each of the ULDs 606-608 being transported by the train 600, not only based on the beacon signals transmitted by the tags 616-618 on top of the ULDs, but also based on beacon signals transmitted by the beacon tags 641-643 on the lower portions of the ULDs, because the latter associate the ULDs with the train 600, and the control system knows the location of the train.

Figure 13:
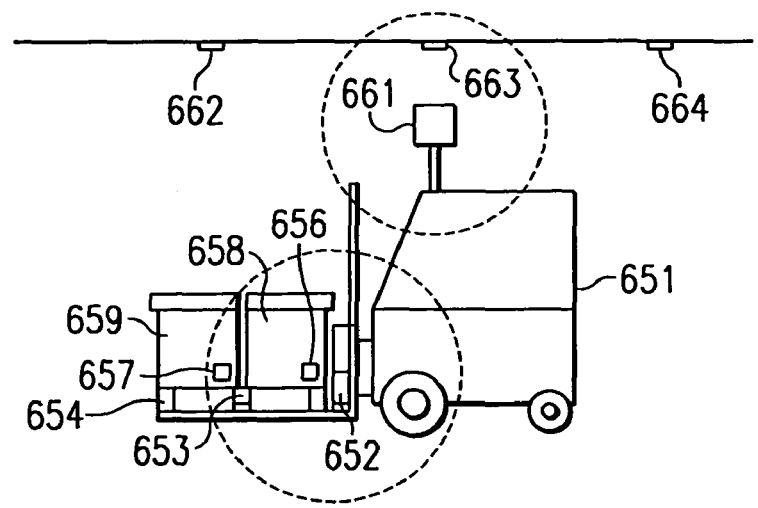
FIG. 13 is a diagrammatic side view of a forklift that carries two signposts of the type shown in FIG. 1, a ceiling bearing several beacon tags of the type shown in FIG. 1, and several items carried by the forklift which each bear a beacon tag of the type shown in FIG. 1.

FIG. 13 is a diagrammatic side view which shows a forklift 651 that has a signpost 652 provided on its vertically movable lift. A pallet 654 is removably supported on the lift, and has a beacon tag 653 provided on it. The transmission range of the signpost 652 is indicated by a broken line circle in FIG. 13, and it will be noted that the tag 653 on the pallet 654 is within this transmission range when the pallet is supported on the lift. Consequently, the tag 653 will transmit beacon signals which include its own unique beacon code and also the signpost code of the signpost 652. Thus, the control system will know from these beacon signals that the pallet 654 is presently being transported by the forklift 651. If the control system knows the items which are currently supported on the pallet, the system will also know where those items are.

It would also be possible to provide beacon tags 656 and 657 on each of the items 658 and 659 on the pallet 654. If the transmission range of the signpost 652 is configured so that tags 656 and 657 are within that transmission range, the tags 656-657 will transmits respective beacon signals which directly advise the system that the items 658-659 are being transported by the forklift 651. Alternatively, the signpost 652 could be provided on the pallet 654, and the beacon tag 653 could be omitted from the pallet 654. In that case, beacon signals from the tags 656-657 would advise the control system of the fact that the items 658-659 are currently on a mobile device which is the pallet 654.

The forklift 651 has a signpost 661 mounted on a post which extends upwardly from the top of the cab. The signpost 661 transmits signpost signals that have a transmission range which does not reach the items 658-659 supported on the lift of the forklift 651. However, beacon tags 662-664 are provided at spaced locations on the ceiling, and each will be within the transmission range of the signpost 661 when the forklift 651 is disposed approximately below it. Thus, based on beacon signals from the tags 662-664, the control system can track movement of the forklift 651 through the facility using a technique of the type described above in association with FIG. 8. As an alternative, it will be recognized that the signpost 661 can be replaced with a beacon tag, and the beacon tags 662-664 can be replaced with signposts, in which case the control system would track the forklift 651 using a technique of the type described above in association with FIG. 7.

Figure 14:
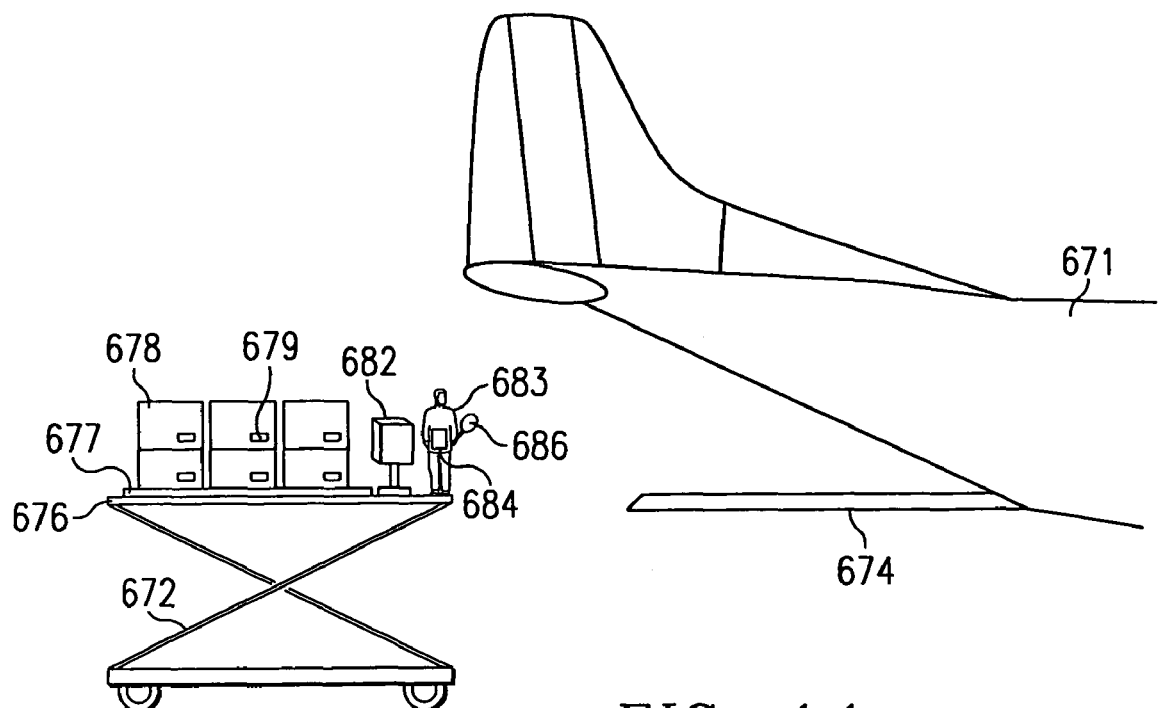
FIG. 14 is a diagrammatic side view of the tail section of an airplane, and a loader which can be used to load or unload the airplane.

FIG. 14 is a diagrammatic side view showing the tail section of an airplane 671, and also a device 672 which is commonly known as a loader, and which can be used to load or unload an airplane. The airplane has a gate or door 674 which has pivoted down to create an approximately horizontal platform. The loader has a horizontal platform 676, and has a powered scissors support for the platform which is capable of vertically raising and lowering the platform, so that it can be vertically aligned with the gate 674 of the airplane.

The platform 676 of the loader 672 supports a pallet 677, and the pallet in turn supports several items, one of which is designed by reference numeral 678. Each of the items on the palette has a beacon tag on it, one of the beacon tags being indicated by reference numeral 679. The platform supports a signpost 682. In response to signpost signals from the signpost 682, the tags 679 on the items 678 transmit respective beacon signals which advise the control system that these items are all currently on the loader 672 that has the signpost 682. An operator 683 carries a handheld unit 684, which is equivalent to the handheld units 571-574 discussed above in association with FIG. 11. Further, the operator carries a portable signpost 686, which can be used to turn off all of the tags 679 as the items 678 are loaded onto the airplane. The control system can verify whether or not all tags have in fact been turned off by evaluating whether any of the tags are still transmitting beacon signals, and can provide feedback through the handheld unit 684 as to whether any tags that should be off are still on. Conversely, of course, if the airplane was being unloaded, the portable signpost could be used to turn on the tags 679, and the tags 679 would then begin transmitting respective beacon signals containing the signpost code of signpost 682, in order to notify the control system that the associated items are all on the loader 672.

Figure 15:
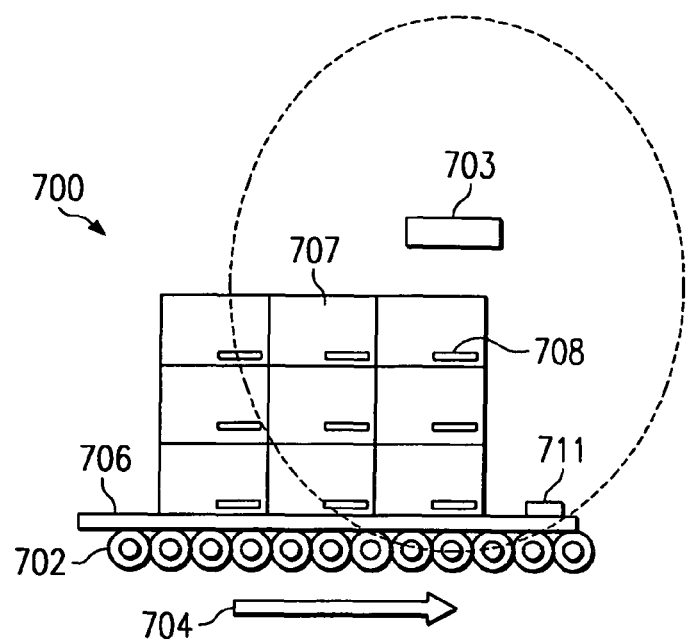
FIG. 15 is a diagrammatic side view of an apparatus which includes a conveyor, a signpost of the type shown in FIG. 1 that is mounted above the conveyor, and several items that are traveling along the conveyor on a palette, and that each have thereon a beacon tag of the type shown in FIG. 1.

FIG. 15 is a diagrammatic side view of an apparatus 700 which includes a conveyor 702 and a signpost 703 that is stationarily mounted above the conveyor 702 on some not-illustrated support, such as a ceiling. The signpost 703 is equivalent to the signpost shown at 11 in FIG. 1. The effective transmission range of the signpost signals transmitted by the signpost 703 is indicated by a broken line in FIG. 15.

A pallet 706 is supported on the conveyor 702, and is being moved in a direction 704 by the conveyor. The pallet 706 has several items on it, one of which is designated by reference numeral 707. Each of the items 707 is a container for packages that are subject to overnight delivery. Each of the items 707 has on it a respective beacon tag, one of which is indicated by reference numeral 708. Each of the beacon tags is equivalent to the beacon tag shown at 12 in FIG. 1.

As the pallet 706 is moved in the direction 704 by the conveyor 702, each of the items 707 on the pallet will pass through the transmission range of the signpost signals from the signpost 703. Thus, each of the beacon tags 708 will transmit to a not-illustrated reader a beacon signal which includes the unique beacon code for that particular beacon tag, and also the signpost code of the signpost 703. Thus, the control system coupled to the reader will be able to determine, based on the receipt of all these beacon signals within a certain window of time, which items 707 are presently disposed on the pallet 706. The control system will also know that these items 707 and the pallet 706 are currently in a location where they are passing the stationary signpost 703.

It would also be possible to provide a further beacon tag 711 on the pallet 706 itself. As the pallet 706 passes the signpost 703, the tag 711 will transmit a beacon signal which includes its own unique beacon code, as well as the signpost code from the signpost 703, so that the control system knows precisely which pallet is currently passing the signpost 703 with the items 707 supported thereon.

Figure 16:
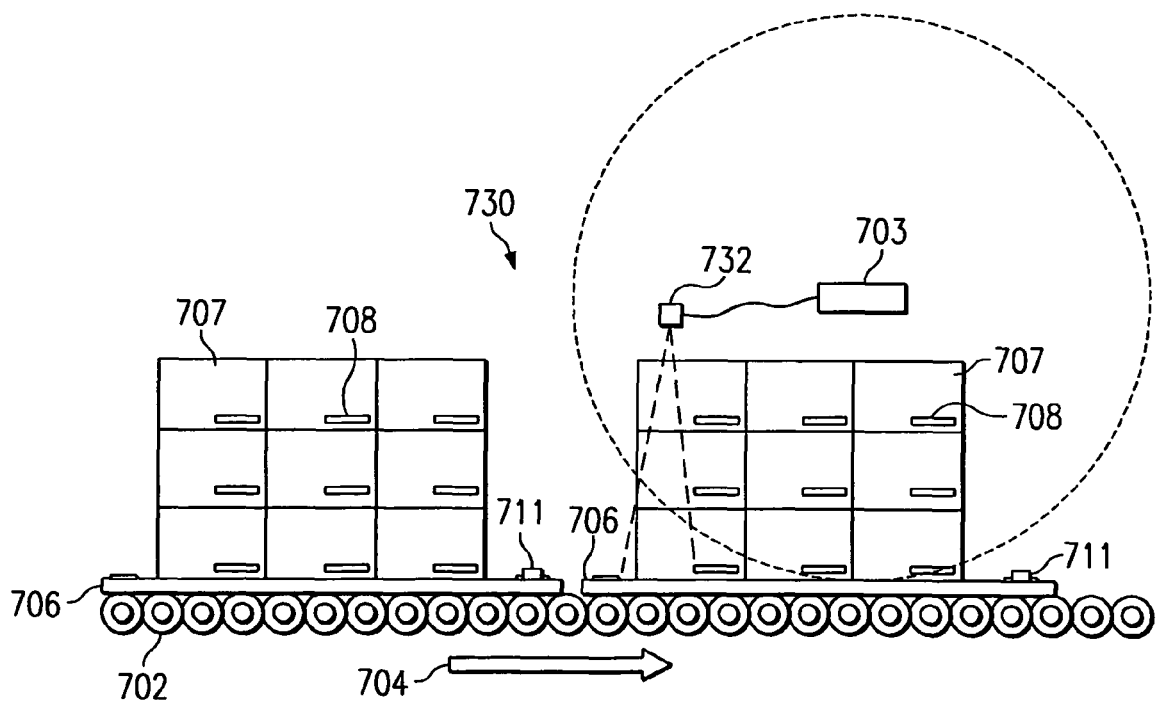
FIG. 16 is a diagrammatic sectional side view of an apparatus which is an alternative embodiment of the apparatus shown in FIG. 7, in that it includes the addition of a sensor which can affect the operation of the signpost.

In some circumstances, a problem can be encountered with the arrangement shown in FIG. 15, where successive palettes are moving along the conveyor 702 with relatively little spacing between them. In this regard, after the beacon tags 708 on the items 707 move out of the transmission range of the signpost 703, they will still continue to transmit beacon signals that include the signpost code of the signpost 703, for the period of time required to complete the beacon sequence which was discussed above in association with FIGS. 4 and 5. If another pallet is moving along the conveyor 702 a short distance behind the illustrated palette 706, the items on that next pallet may move into the transmission range of the signpost 703 and begin transmitting beacon signals with its signpost code while the beacon tags on the illustrated pallet 706 are still winding up their beacon sequences. In that case, the control system would find it difficult to distinguish which items are on which of the two pallets. FIG. 16 is a diagrammatic sectional side view of an apparatus 730 which is intended to avoid this problem.

More specifically, the apparatus 730 is an alternative embodiment of the apparatus 700 shown in FIG. 15. The apparatus 730 includes all of the elements discussed above in association with apparatus 700. In addition, it includes a sensor 732 which is stationarily mounted, for example on the same ceiling or support as the signpost 703. The sensor 732 is positioned upstream of the signpost 703 with respect to the direction 704 in which materials move along the conveyor 702. In fact, the sensor 732 is positioned so that it can detect a new pallet 706 and the items thereon, just about the time that they first begin to move into the transmission range of the signpost 703. The sensor 732 may be any of several different types of known sensors, such as a sensor which detects the motion of the pallet 706, or a proximity sensor which senses the distance to the nearest item below it.

The sensor 732 is coupled by wires to the signpost 703. When the sensor 732 detects that a new pallet 706 with items 707 thereon is about to move into the transmission range of the signpost 703, the sensor 732 sends a signal to the signpost 703, and the signpost 703 responds by altering its signpost code. The signpost 703 could, for example, increment its signpost code. The signpost 703 could thus be assigned several unique and successive signpost codes which the control system knew were all associated with a single signpost, and could successively cycle through those codes. Alternatively, it would be possible to simply toggle the most significant bit of the signpost code.

As the tags 708 on the new pallet move into the transmission range of the signpost 703, they will begin receiving signpost signals from the signpost 703 that contain the modified signpost code, and they will begin transmitting beacon signals that include their own unique beacon codes, and also the modified signpost code from the signpost 703. It will be recognized that, if the tags 708 on the preceding pallet have all moved out of the transmission range of the signpost 703 before the signpost 703 modifies its signpost code, it will be very easy for the control system to distinguish the items 707 on one pallet from the items 707 on the next successive pallet. However, even if the pallets are closer than this, as illustrated in FIG. 16, such that some of the tags 708 on each of the two adjacent pallets are all within the transmission range of the signpost 703 at the point in time when the signpost 703 changes its signpost code, the control system can still accurately distinguish the items on one pallet from the items on another pallet.

In more detail, and as noted above, the control system will be aware of all of the possible signpost codes associated with the signpost 703. Further, the beacon tags on the first pallet will each have transmitted beacon signals that contain the prior signpost code. If those beacon tags suddenly begin transmitting beacon signals with the modified signpost code, the control system can detect this and ignore those beacon signals. In contrast, the beacon tags on the next palette will have been sending beacon signals which do not contain any signpost code, and will suddenly begin transmitting beacon signals which include the modified signpost code. The control system can detect this and thus distinguish the beacon tags on items disposed on one palette from the beacon tags on items disposed on the other palette.

The present invention provides a number of technical advantages. One such technical advantage results from the capability to dynamically vary the duration of the signals transmitted by the tag. For example, the amount of information transmitted and thus the duration may be shorter when the tag is not currently receiving a signal from any signpost, whereas the duration may be longer when the tag is receiving a signpost signal and needs to include a signpost code in the transmitted signals. This helps reduce the cumulative amount of time during which the tag is actively transmitting, which in turn can facilitate compliance with governmental regulations.

Another advantage results from the capability for the tag to vary at least one of its transmission rate and transmission power in a dynamic manner, based on operating conditions such as whether the tag is currently receiving signals from a signpost. This also helps to facilitate compliance with governmental regulations. Further, these types of variations can help to reduce the likelihood of collisions with signals transmitted by other tags, while ensuring that the reader reliably receives at least one transmission from each tag within a reasonably short period of time.

Although several selected embodiments have been illustrated and described in detail, it will be understood that other substitutions and alterations are possible without departing from the spirit and scope of the present invention, as defined by the following claims.

What is claimed is:

1. An apparatus comprising a tag having circuitry which includes:
   a receiver section configured to receive near field wireless signpost signals of primarily magnetic character transmitted at a first frequency allowing transmission over a first distance, the received signpost signals including a signpost code and the first distance is up to about twelve (12) feet; and
   a transmitter section configured to transmit wireless beacon signals to a remote reader at a second frequency allowing transmission over a second distance, the transmitted wireless beacon signals including a beacon code associated with said tag, said transmitter section being responsive to receipt by said receiver section of a respective said signpost signal for including in at least one said beacon signal an information portion that is based on the received signpost signal, wherein the first distance is less than the second distance and the second frequency is different from the first frequency and substantially higher than the first frequency.

2. An apparatus according to claim 1, wherein said transmitter section is configured to transmit said beacon signals over the second distance which is up to about three hundred (300) feet.

3. An apparatus according to claim 1, wherein at least part of said signpost signal is subject to one of encryption and password protection.

4. An apparatus according to claim 1, wherein said second frequency is selected so that said beacon signal acts as a far field signal, said signpost signal having a roll-off which is several times larger than a roll-off of said beacon signal.

5. An apparatus according to claim 1, wherein said first frequency is approximately 132 KHz.

6. An apparatus according to claim 1, wherein said second frequency is one of approximately 433.92 MHz and approximately 915 MHz.

7. An apparatus according to claim 1, wherein said transmitter section is configured to transmit said beacon signals using a slotted aloha protocol.

8. An apparatus according to claim 1, wherein said signpost signals include an error control portion which is used by said receiver section of said tag to check for errors in each said signpost signal received by said receiver section.

9. An apparatus according to claim 1, wherein said transmitter section is configured to form said beacon signals by effecting modulation of a carrier signal using a Manchester encoded frequency shift keying (FSK) protocol.

10. An apparatus according to claim 1, wherein said signpost signals include amplitude modulation of a carrier signal with an amplitude shift keying (ASK) protocol.

11. An apparatus according to claim 1, wherein said tag further includes a housing having therein said receiver and transmitter sections, and a coupling section capable of physically coupling said housing to a mobile device.

12. An apparatus according to claim 1, wherein said tag includes a battery which powers said circuitry therein.

13. A method, comprising the steps of:
receiving, in a receiver section of a tag, wireless signpost signals that each include a signpost code transmitted at a first frequency allowing transmission over a first distance that is up to about twelve (12) feet, said wireless signpost signals being near field signals of primarily magnetic character; and
transmitting from a transmitter section of said tag wireless beacon signals to a remote reader at a second frequency that is different from and greater than the first frequency and allows transmission over a second distance that is greater than the first distance which each include a beacon code associated with said tag, said transmitting step including the step of causing said transmitter section to be responsive to receipt by said receiver section of a respective said signpost signal for including in at least one said beacon signal an information portion that is based on the received signpost signal.

14. A method according to claim 13, wherein said transmitting step includes the step of transmitting said beacon signals over the second distance which is up to about three hundred (300) feet.

15. A method according to claim 13, wherein said selecting step includes the step of selecting said second frequency so that said beacon signal acts as a far field signal, said signpost signal having a roll-off which is several times larger than a roll-off of said beacon signal.

16. A method according to claim 13, wherein said selecting step includes the step of selecting said first frequency to be approximately 132 KHz.

17. A method according to claim 13, wherein said selecting step includes the step of selecting said second frequency to be one of approximately 433.92 MHz and approximately 915 MHz.

18. A method according to claim 13, including the step of providing an error control portion in each said signpost signal, and wherein said receiving step includes the step of causing said receiver section to use said error control portion of each said signpost signal received by said receiver section to check for errors in that signpost signal.

19. An apparatus comprising a tag having circuitry which includes:
a receiver section configured to receive wireless signpost signals that each include a digital word having bits serially modulated onto a predetermined carrier frequency using amplitude modulation, the digital word comprising a preamble, a signpost code, a flag, an error control portion, and a command portion separate and mutually exclusive of the preamble, the command portion including a tag command field, a control command field, and a parameter field, wherein the parameter field includes a parameter for implementing a command specified by the control command field; and
a transmitter section configured to transmit wireless beacon signals which each include a digital beacon word associated with said tag, the digital beacon word including a preamble, a format field, a tag type field including information related to the use of the tag, an error control field, a beacon code, and an asset type field, said transmitter section being responsive to receipt by said receiver section of a respective said signpost signal for further including in the digital beacon word the received signpost code and the received tag command field or control command field as a confirmation that the tag has received the tag command or control command;
wherein said tag is responsive to said command portion of a respective said digital word received by said tag for effecting a control function within said tag.

20. An apparatus according to claim 19, wherein said control function includes changing a transmit power of said beacon signals.

21. An apparatus according to claim 19, wherein said control function includes placing said tag into one of a normal operational mode and a restricted operational mode, said transmitter section being respectively enabled and disabled in said normal and restricted operational modes.

22. An apparatus according to claim 21, wherein said tag consumes less power in said restricted operational mode.

23. An apparatus according to claim 21, wherein said tag automatically enters said restricted operational mode in the absence of receipt by said tag of any said signpost signal for a predetermined time interval.

24. An apparatus according to claim 19, wherein said control function includes changing a rate of transmission of said beacon signals by said transmission section of said tag.

25. An apparatus according to claim 19, wherein the parameter for implementing a command specified by the control command field comprises an operational parameter of said tag.

26. An apparatus according to claim 25, wherein said operational parameter is said beacon code of said tag.

27. An apparatus according to claim 25, wherein said operational parameter is an informational field other than said beacon code which is included in said beacon signals.

28. An apparatus according to claim 25, wherein said operational parameter is one of a password and an encryption code used in association with transmission and reception of at least one of said signpost signals and beacon signals.

29. An apparatus according to claim 19, including:
a signpost which transmits said wireless signpost signals;
a control system having a reader which receives said beacon signals; and
a communication link which facilitates communication between said signpost and said control system, said control system being operable to send instructions to said signpost through said communication link which influence said signpost signals transmitted by said signpost.

30. An apparatus according to claim 29, wherein said instructions sent through said communication link include instructions which control what said signpost uses for said command portion of said signpost signals.

31. A method comprising the steps of:
receiving in a receiver section of a tag wireless signpost signals that each include a digital word having bits serially modulated onto a predetermined carrier frequency using amplitude modulation, the digital word comprising a preamble, a signpost code, a flag, an error control portion, and a command portion separate from and mutually exclusive of said preamble, the command portion including a tag command field, a control command field, and a parameter field, wherein the parameter field includes a parameter for implementing a command specified by the control command field;

transmitting from a transmitter section of said tag wireless beacon signals which each include a digital beacon word associated with said tag, the digital beacon word including a preamble, a format field, a tag type field including information related to the use of the tag, an error control field a beacon code, and an asset type field, said transmitting step including the step of causing said transmitter section to be responsive to receipt by said receiver section of a respective said signpost signal for further including in the digital beacon word the received signpost code and the received tag command field or control command field as a confirmation that the tag has received the tag command or control command; and effecting a control function within said tag in response to said command portion of a respective said signpost signal received by said tag.

32. A method according to claim 31, wherein said step of effecting said control function includes the step of changing a transmit power of said beacon signals.

33. A method according to claim 31, wherein said step of effecting said control function includes the step of placing said tag into one of a normal operational mode and a restricted operational mode, said transmitter section being respectively enabled and disabled in said normal and restricted operational modes.

34. A method according to claim 33, including the step of causing said tag to operate in a manner which consumes less power when said tag is in said restricted operational mode.

35. A method according to claim 33, including the step of causing said tag to automatically enter said restricted operational mode in the absence of receipt by said tag of any said signpost signal for a predetermined time interval.

36. A method according to claim 31, wherein said step of effecting said control function includes the step of changing a rate of transmission of said beacon signals by said transmission section of said tag.

37. A method according to claim 31, wherein said step of effecting said control function includes the step of changing an operational parameter specified by the parameter field of said tag.

38. A method according to claim 37, including the step of selecting said beacon code of said tag as said operational parameter.

39. A method according to claim 37, including the step of selecting as said operational parameter an informational field other than said beacon code which is included in said beacon signals.

40. A method according to claim 37, including the step of selecting as said operational parameter one of a password and an encryption code used in association with transmission and reception of at least one of said signpost signals and beacon signals.

41. A method according to claim 31, including the steps of:
transmitting said signpost signals from a signpost which is separate from said tag;
receiving said beacon signals in a reader which is a part of a control system separate from said tag;
providing a communication link between said control system and said signpost; and
sending from said control system to said signpost through said communication link instructions which influence said signpost signals transmitted by said signpost.

42. A method according to claim 41, including the step of causing said signpost to vary what said signpost uses for said command portion of said signpost signals as a function of said instructions sent through said communication link.

* * * * *